(No Model.)  7 Sheets—Sheet 2.

H. M. NEER.
CASH REGISTER AND INDICATOR.

No. 599,625.  Patented Feb. 22, 1898.

Witnesses:
Clifford N. White
Florence King.

Inventor:
Harry M. Neer
By Walter H. Chamberlin
Atty.

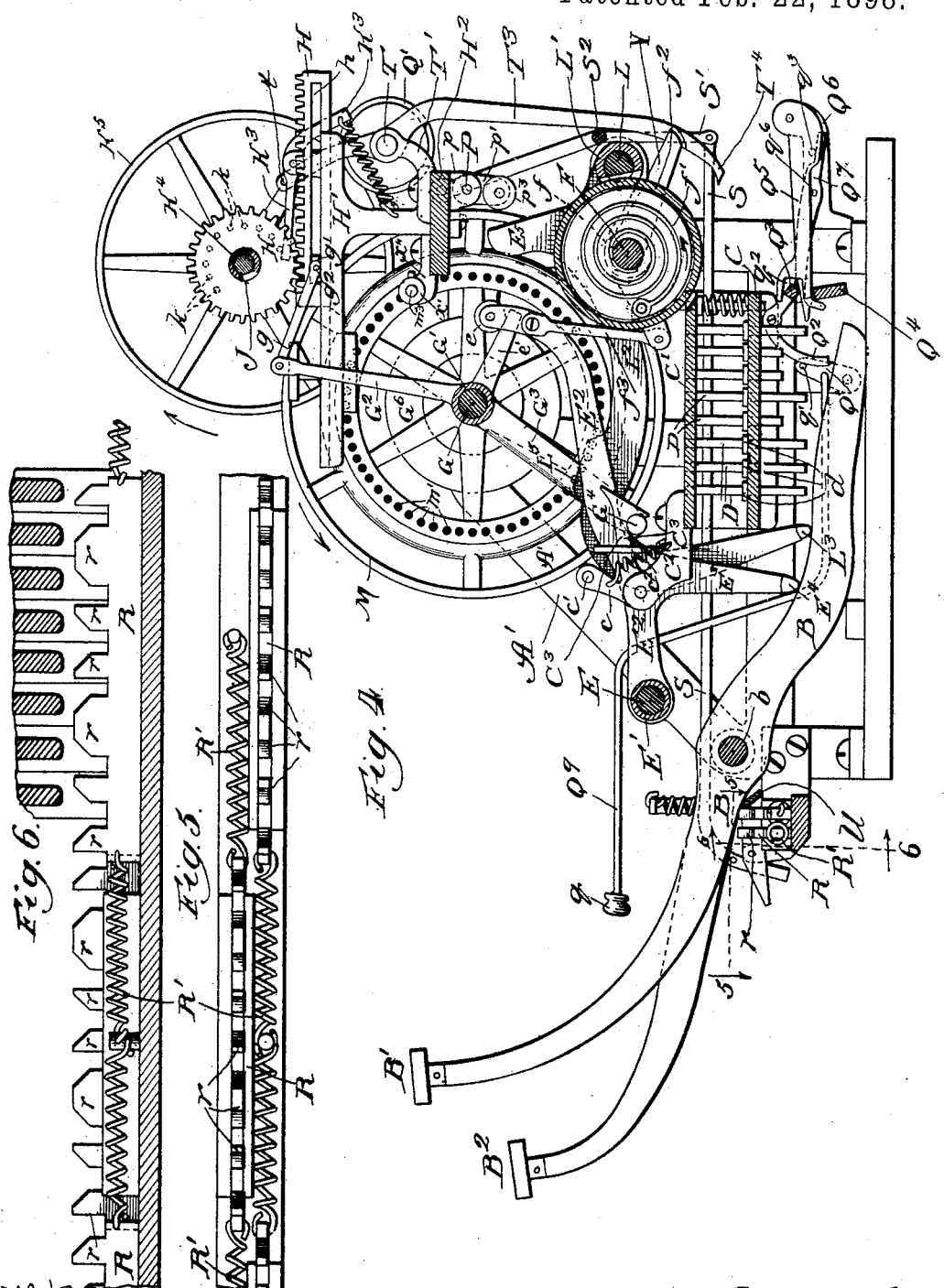

(No Model.) 7 Sheets—Sheet 4.
H. M. NEER.
CASH REGISTER AND INDICATOR.
No. 599,625. Patented Feb. 22, 1898.
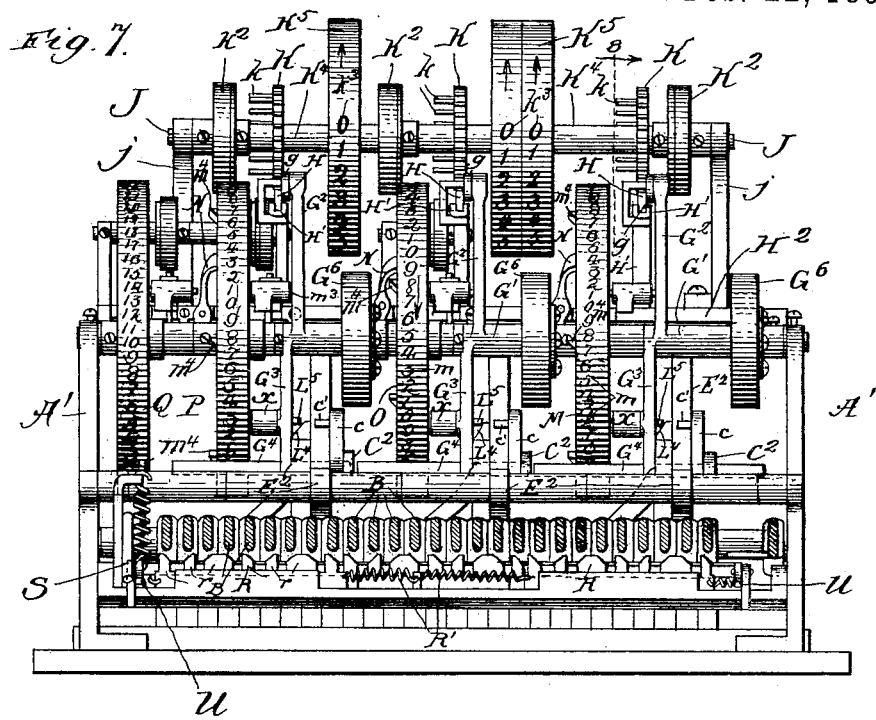
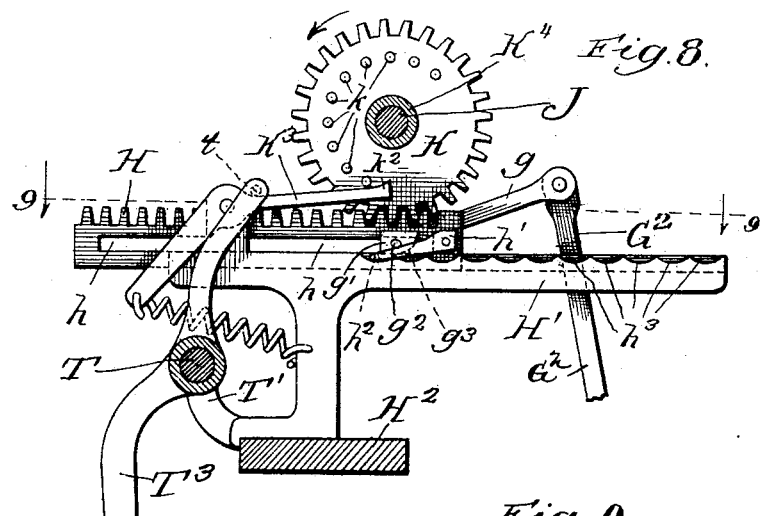
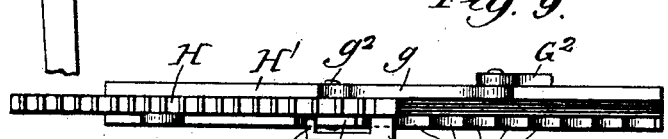
Witnesses:
Clifford N. White
Florence King
Inventor:
Harry M. Neer
By Walter H. Chamberlin
Att'y
THE NORRIS PETERS CO., PHOTO-LITHO., WASHINGTON, D. C.

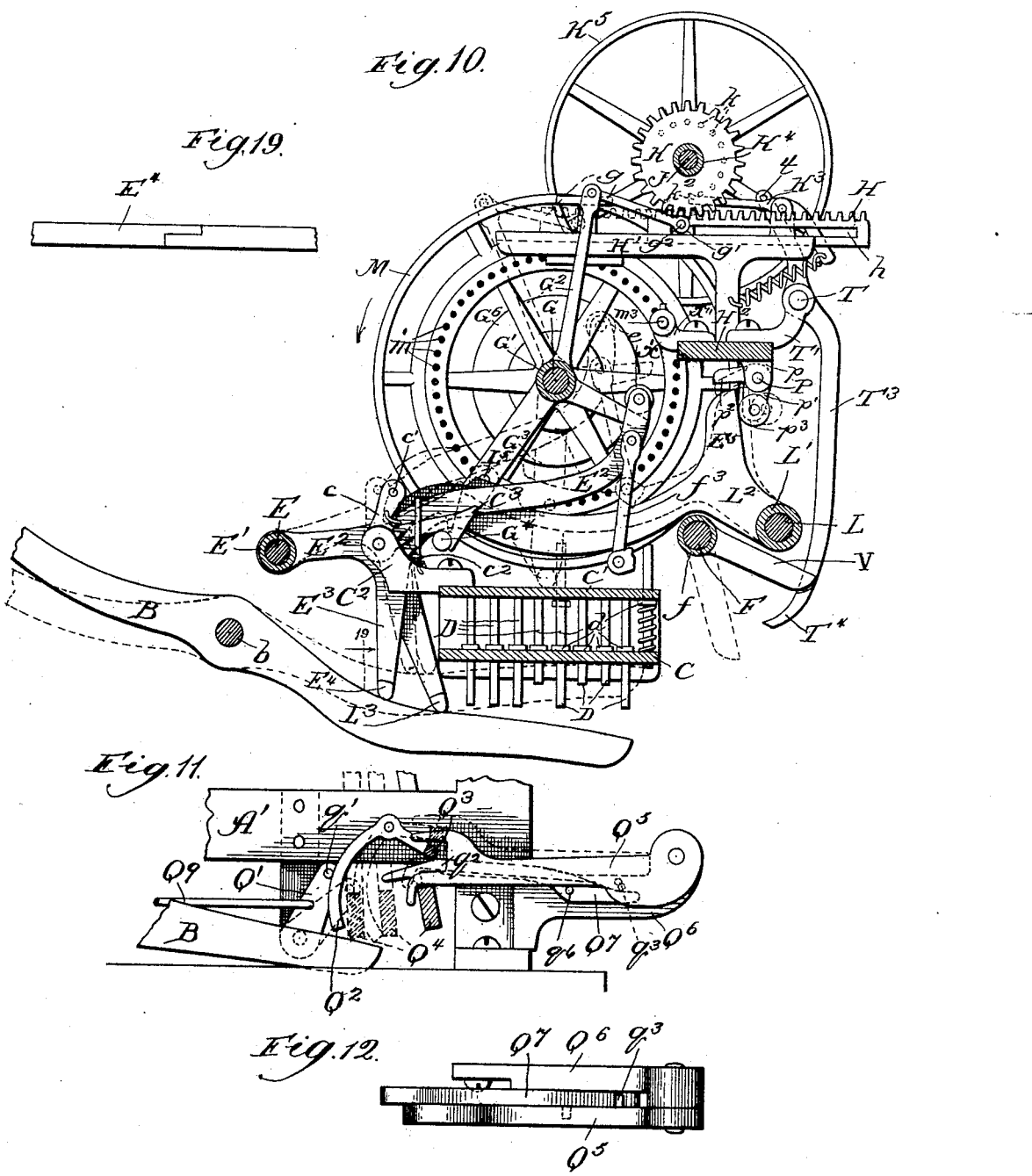

(No Model.) 7 Sheets—Sheet 6.
H. M. NEER.
CASH REGISTER AND INDICATOR.
No. 599,625. Patented Feb. 22, 1898.
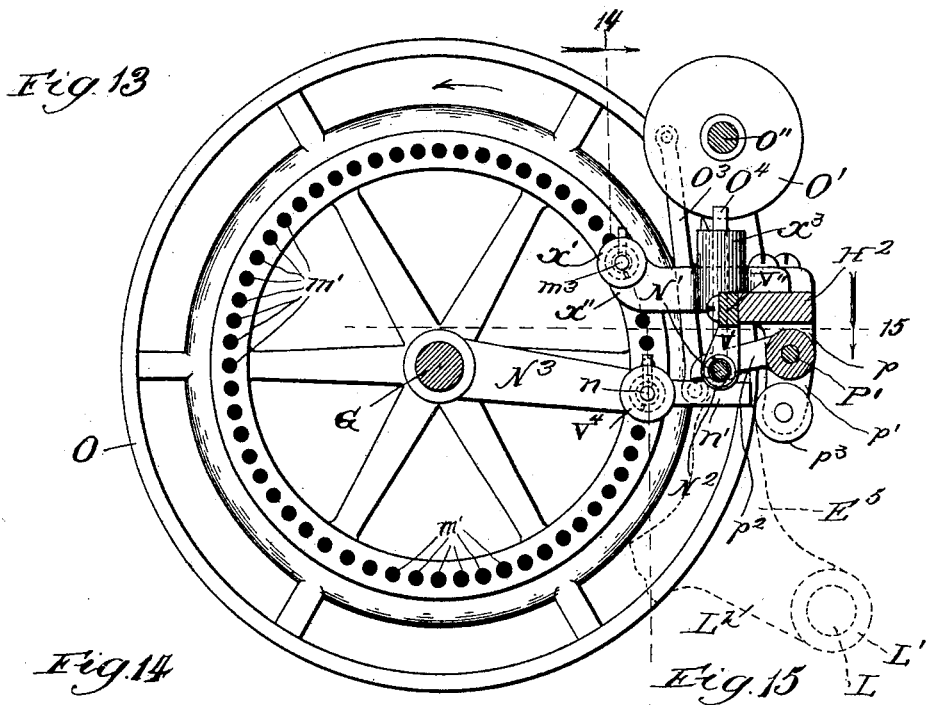
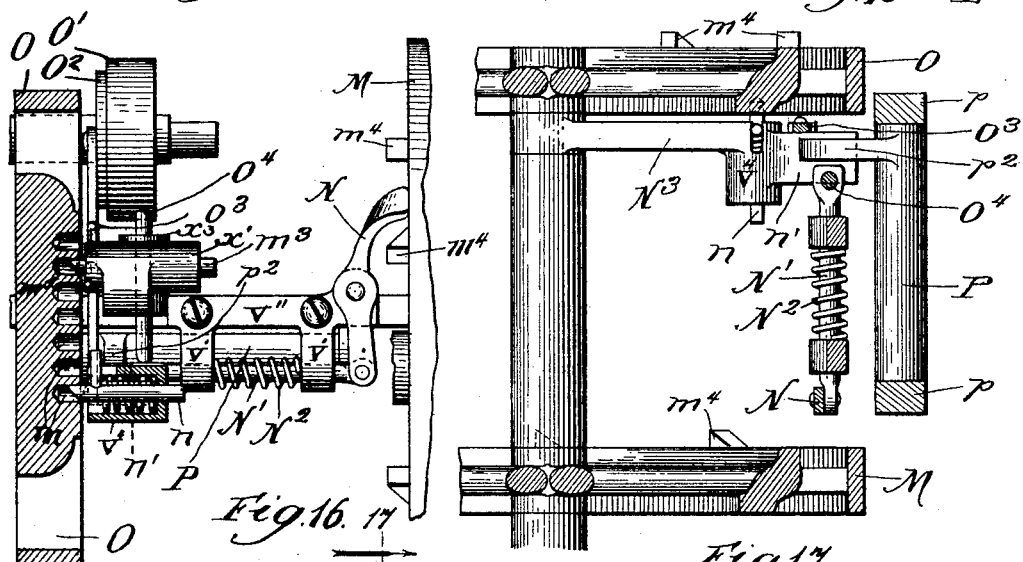
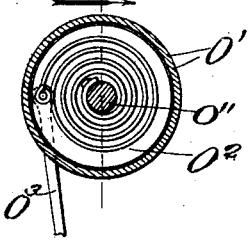
Witnesses:
Clifford N. White
Florence King
Inventor:
Harry M. Neer
By Miles H. Chamberlin
Atty.

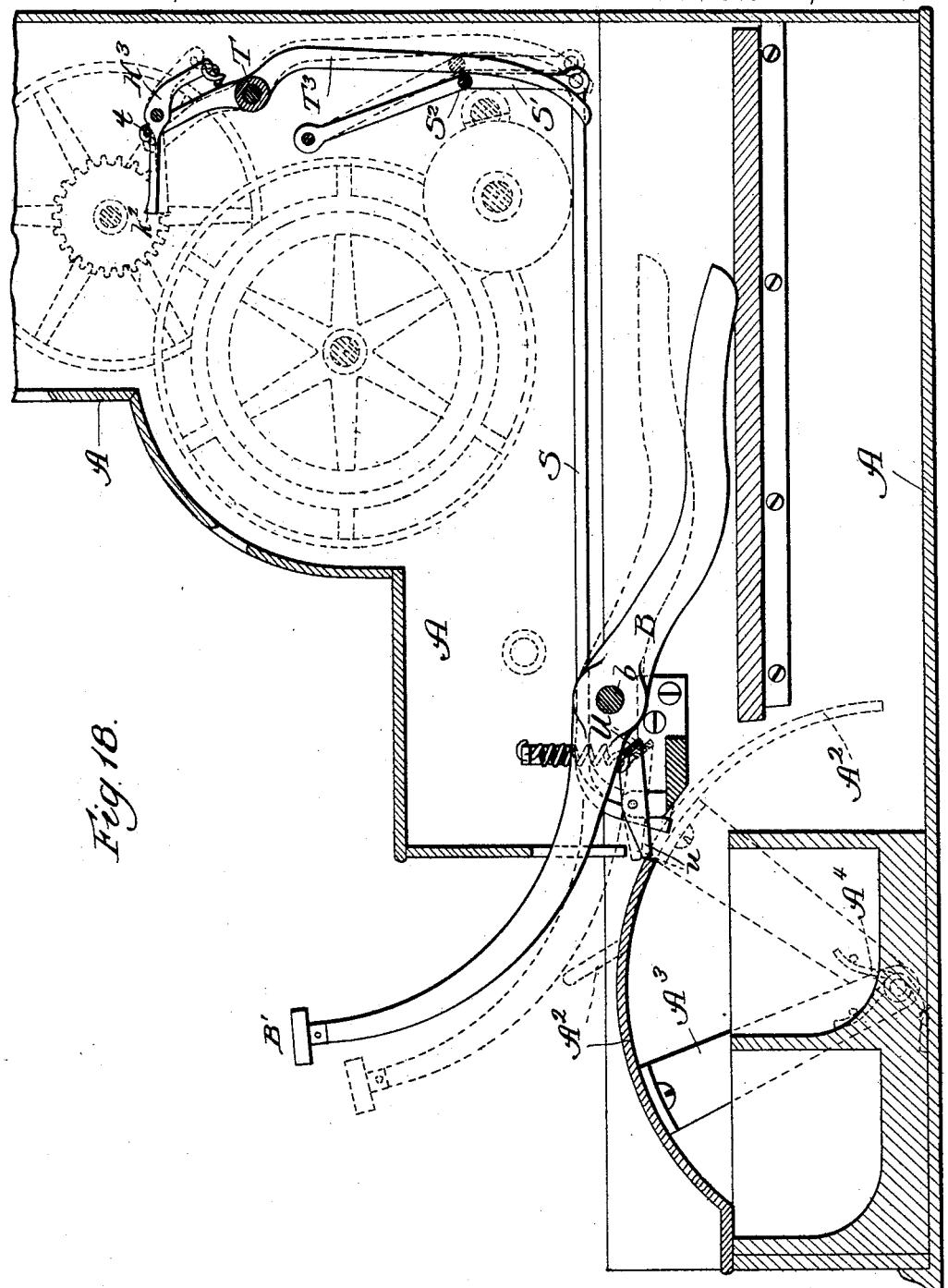

UNITED STATES PATENT OFFICE.

HARRY M. NEER, OF SPRINGFIELD, OHIO, ASSIGNOR, BY MESNE ASSIGNMENTS, TO THE NATIONAL CASH REGISTER COMPANY, OF DAYTON, OHIO.

CASH REGISTER AND INDICATOR.

SPECIFICATION forming part of Letters Patent No. 599,625, dated February 22, 1898.

Application filed September 9, 1893. Serial No. 485,156. (No model.)

*To all whom it may concern:*

Be it known that I, HARRY M. NEER, a citizen of the United States, residing at Springfield, in the county of Clark, in the State of Ohio, have invented certain new and useful Improvements in Cash Registers and Indicators, of which the following is a description, reference being had to the accompanying drawings, forming part of this specification.

My invention has for its object the production of a simple and efficient machine by means of which the amounts of various sales or other transactions may be conveniently and accurately registered and indicated; and its novelty consists in certain new constructions, arrangements, combinations, and modes of operation of the various parts of such a machine, all of which will be hereinafter more fully explained, and particularly pointed out in the claims.

Figure 1:
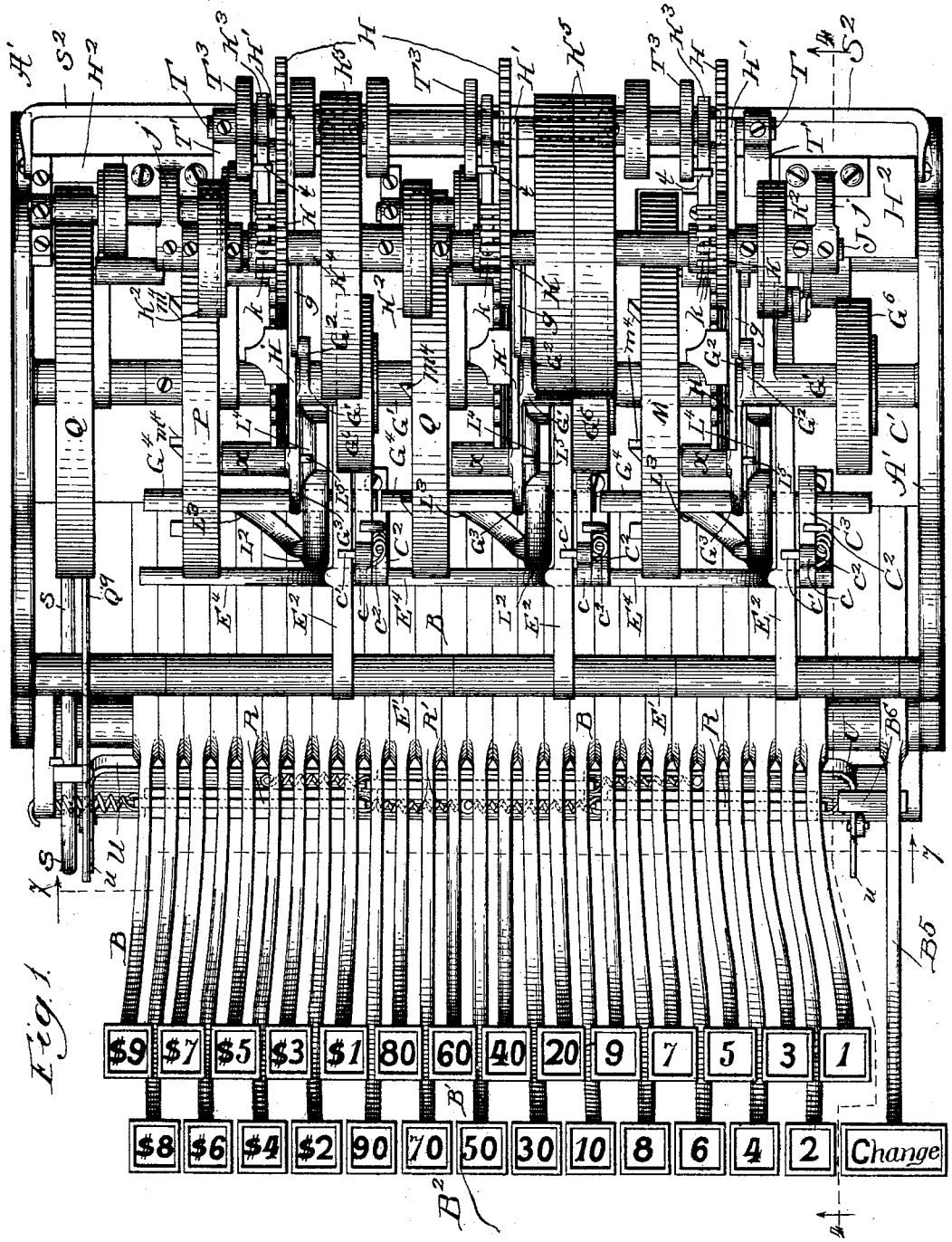
Figure 2:
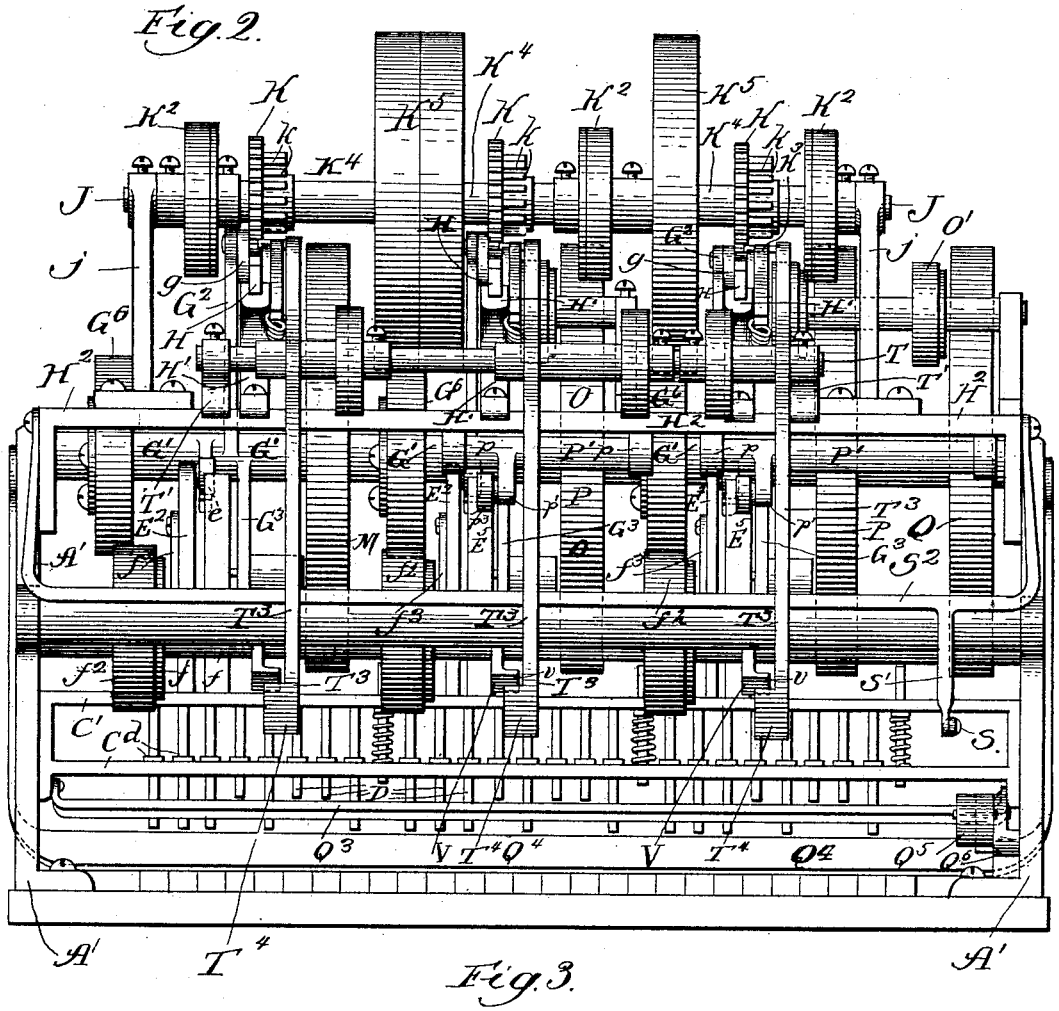
Figure 3:
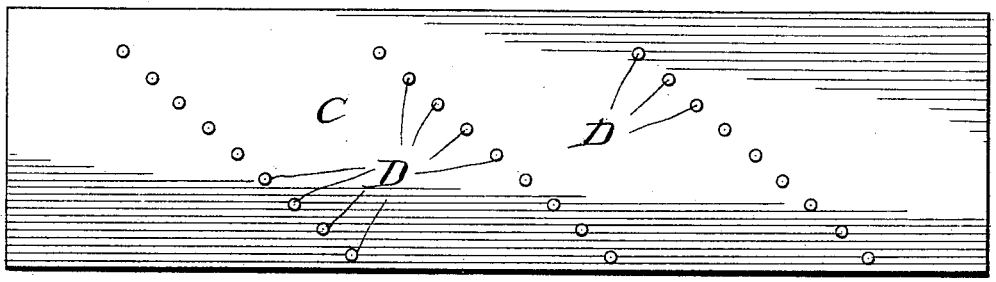

In the accompanying drawings, Figure 1 is a top plan view of the machine with the casing removed; Fig. 2, a rear elevation of the same; Fig. 3, a plan view of one of the frame-plates, showing the rows of holes through which the several series of stop-pins pass. Fig. 4 is a longitudinal vertical section approximately on the line 4 4 of Fig. 1; Figs. 5 and 6, enlarged detail views of the key-locking devices; Fig. 7, a front elevation of the machine with the front ends of the key-levers cut off along the line 7 7 of Fig. 1; Fig. 8, an enlarged detail view of part of the indicating devices; Fig. 9, a plan view of some of the parts shown in Fig. 8; Fig. 10, a view corresponding to Fig. 4 of some of the parts shown in the latter view and with dotted lines indicating some of the parts when moved from normal position; Figs. 11 and 12, enlarged detail views of parts of the locking-bar-operating mechanism; Fig. 13, an enlarged detail view of one of the registering-wheels and some of its coöperating parts; Fig. 14, a detail view from Fig. 13, being a section approximately on the line 14 14 of said figure; Fig. 15, a further detail from Fig. 13, being a horizontal section approximately on the line 15 15 of said figure; Figs. 16 and 17, detail views of one of the coiled springs and its casing; Fig. 18, a vertical longitudinal section of the machine near one side thereof, showing the casing and the money-receptacle and its movable lid; and Fig. 19, a detail from Fig. 10.

The same letters of reference are used to indicate identical parts in all the views.

The principal working parts of the machine are inclosed in a casing A (shown in Fig. 18) and are supported in a framework composed of two vertical side frames A' A', secured at their lower ends upon a base-plate, Figs. 1, 2, and 4, and connected by various cross-rods, bars, and plates hereinafter referred to.

Mounted upon a rod $b$, fixed at its opposite ends in the side frames A' at the lower forward part of the machine, are the key-levers B, having their upper forward ends arranged for convenience in two horizontal rows B' and B² and provided with the usual numbered finger-buttons representing the values of the respective keys. Mounted above the rear ends of the levers B in fixed horizontal plates C and C', secured at their opposite ends to the frame-plates A', Figs. 2, 4, and 10, are a series of vertically-movable stop-pins D, provided with collars $d$ between the plates C and C', by which collars the pins are held in place and limited in their movements.

As shown in Fig. 1, the key-levers B are in the present instance twenty-seven in number, divided into three sets or groups of nine keys each, the right-hand group representing units of cents from "1" to "9," the middle group tens of cents from "10" to "90," and the right-hand group units of dollars from "1" to "9." There are a corresponding number of stop-pins D, likewise arranged in three sets or groups, one corresponding to and coöperating with each set of keys. Each set of pins D is arranged in a diagonal row, as shown in Fig. 3, so that the pins in each set will stand immediately over the rear ends of the respective key-levers of the corresponding set, with the result that whenever the front end of any key-lever is depressed its rear end will contact with and lift the particular stop-pin D located above such lever. The stop-pins D, excepting the rearmost one in each set, are normally in inoperative position, and the function of the key-lever with respect to them is to move them into operative position, for a purpose hereinafter described. The rearmost stop in each set is normally held in elevated position by a spring surrounding it beneath its collar $d$, Figs. 2, 4, and 10, so that this stop is always in operative position.

The several registering-wheels of the machine are loosely mounted upon a central rod or shaft G, fixed at its opposite ends in the side frames A'. As seen in Figs. 1, 2, and 7, there are in the present instance four of these registering-wheels M O P Q, of which the first three correspond to and coöperate with the three sets or groups of keys, there being one registering-wheel for each denomination of value, while the fourth wheel Q is actuated by a transfer or carrying mechanism between it and the wheel P, there being suitable transfer or carrying devices between the several wheels, as hereinafter described, by means of which when any wheel has been turned a predetermined distance the next higher wheel will be advanced one number.

Hung upon the same rod G which carries the several registering-wheels are a series of swinging frames, by means of which the several wheels are actuated, there being one of these swinging frames for each of the three wheels corresponding to the three sets of keys, but none for the fourth wheel Q. All three of these swinging frames are shown in Fig. 7, where, and also as shown in Figs. 4 and 10, it will be seen that in the particular form shown each frame consists of a lever composed of a hub or sleeve $G'$, mounted upon the rod G and having an upwardly-extending arm $G^2$ and an opposite downwardly-extending arm $G^3$. As also shown in Fig. 7, each of these swinging frames has projecting to the left from the lower end of its arm $G^3$ a horizontal rod $G^4$, and these rods $G^4$ of the respective frames coöperate with the corresponding sets or rows of stop-pins D, Figs. 3 and 4, in a manner hereinafter described, to limit the movements of the swinging frames and thereby also limit the movements imparted by said frames to the registering and indicating wheels, as hereinafter explained.

Suitable springs applied to the respective swinging frames normally tend to swing their lower ends rearward and cause their horizontal rods $G^4$ to sweep over the upper ends of the stop-pins D in the respective rows. When said stop-pins are in their lower normal position, the rods $G^4$ of the swinging frames will pass freely over them; but when any stop-pin is lifted, as by the depression of the front end of its coöperating key-lever B, its upper end will be carried into the path of the rod $G^4$ of the corresponding swinging frame, so that when the latter is swung rearward by its spring its rod $G^4$ will contact with such stop-pin and the frame be thereby arrested. The arrangement and adjustment of the parts are such that the movement of any frame from normal position until so arrested by any one of its coöperating stop-pins will represent the value of such pin or of the key-lever corresponding to such pin, and as a corresponding movement will be transmitted by the swinging frame to the register-wheel and the indicator-wheel coöperating with such frame by the means hereinafter described the value of such stop-pin or its coöperating lever will be registered and indicated.

Any suitable springs for actuating the swinging frames may be employed, those in the present instance being coiled springs inclosed in circular casings $G^6$, secured upon the rod G, as seen in Figs. 1, 2, 4, and 7. The springs within these casings $G^6$ are not shown in the drawings; but it will be sufficient to say that the outer end of each spring is secured to its casing $G^6$, while its inner end is secured to the adjacent end of the hub or sleeve $G'$ of the swinging frame and tends to turn the latter upon the rod G and swing the lower end of the frame rearward.

The several swinging frames are held in normal position by latches $C^3$, pivoted in supporting plates or brackets $C^2$, secured upon the plate C', Figs 4 and 10, and coöperating with the rods $G^4$ of the swinging frames, springs $c^2$, connected to the latches and to the brackets $C^2$, yieldingly holding the latches in engagement with the rods of the frames. When any latch $C^3$ is lifted out of engagement with the rod $G^4$ of the corresponding swinging frame, the latter will be released and swung rearward until arrested by contact of its rod with some one of the stop-pins D which has been lifted into its path. The operation of this portion of the machine therefore consists in moving some one of the stop-pins D into the path of the swinging frame and then releasing the latter and permitting its spring to move it until it is arrested by contact with such pin. In the present instance the latches $C^3$ are disengaged from the rods $G^4$ of the swinging frames by the same operation of the key-levers which lifts the stop-pins into the paths of the frames, the adjustment being such that the pins will be lifted into the paths of the frames before the latter are released; but it is obvious that, if desired, the stop-pins may be set and the latches be tripped or disengaged from the swinging frames by successive independent operations.

The means employed in the present instance for tripping the latches by the operation of the key-levers B consists of levers $E^2$, Figs. 1, 4, 7, and 10, hung by hubs or sleeves $E'$ at their forward ends upon a rod E, fixed at its opposite ends in the side frames A' of the machine. Each of the levers $E^2$ has a rearwardly and upwardly extending arm and a vertically-depending arm $E^3$, Fig. 4, provided at its lower end with a laterally-projecting rod or bar $E^4$. There is one of these levers $E^2$ for each group of key-levers B, and the laterally-projecting rod $E^4$ of each lever overlies all of the key-levers of the corresponding group, so that when the front end of any lever is depressed and its rear end lifted the corresponding lever $E^2$ will be likewise lifted. Each latch $C^3$ is located adjacent one of the levers $E^2$, and an arm $c$, extending upwardly from the front end of the latch, is provided with a pin $c'$, projecting over and into the path of the lever $E^2$, with the result that when any lever $E^2$ is lifted by the operation of a key-lever it will, as it approaches its limit of upward movement, contact with the pin $c'$ and disengage the latch $C^3$ from the rod $G^4$ of the corresponding swinging frame. The operation of the key-lever will have lifted one of the stop-pins D into the path of the rod $G^4$ prior to such disengagement of the latch from the rod, so that when the frame is released and swung rearward by the action of its spring it will contact with and be arrested by the stop-pin which has been projected into its path.

Each lever $E^2$ carries at its upper rear end a roller $e$, which overlies and normally rests upon an arm $e'$, projecting rearwardly from one of the swinging frames hung upon the rod G, Fig. 4, and the lever $E^2$ is connected by a link $f^3$ with an arm secured to and projecting from a disk $f'$, carried by a sleeve $f$, loosely mounted upon a rod F, extending transversely across the machine and fixed at its opposite ends in the side frames thereof. The disk $f'$ is inclosed within a casing $f^2$, fixed upon the rod F, and this casing contains a coiled spring whose inner end is secured to the rod F and whose outer end is secured to the disk $f'$, which spring tends to turn the disk $f'$ forward and pull the upper rear end of the lever $E^2$ downward and yieldingly hold it in normal position. As seen in Fig. 2, there is one of these springs and its connections for each of the swinging frames upon the rod G, and these springs are the means by which such swinging frames are returned to normal position after they have been released by the operation of the key-levers and moved by their actuating-springs within the casings $G^6$, as heretofore described. The resetting-springs within the casings $f^2$ are of greater strength than the actuating-springs within the casings $G^6$, so that when permitted to do so they will overcome the resistance of the actuating-springs and restore the parts to normal position and place the actuating-springs under tension. When any key-lever B is operated, the lifting of the corresponding lever $E^2$ (against the resistance of the resetting-spring within the casing $f^2$) will carry the roller $e$ of the lever $E^2$ away from the arm $e'$ of the swinging frame, thereby disconnecting the frame from the resetting-spring and permitting the frame to be moved by its actuating-spring when released by its latch in the manner heretofore described. When the operated key-lever is released, however, the resetting-spring will draw the upper rear end of the lever $E^2$ downward again, and its roller $e$ will contact with the arm $e'$ of the swinging frame and return the latter to normal position and cause its rod $G^4$ to be reëngaged by its latch $C^3$.

In the manner and by the means described, therefore, at each operation of the machine a stop-pin D in one or more of the sets will be moved into the path of the corresponding swinging frame, and the latter will then be released and moved by its actuating-spring until it contacts with and is arrested by the stop-pin, and at the end of the operation the swinging frame or frames which have been moved will be returned to normal position and reëngaged by their latches. It will be next in order to describe the means by which the movements of the respective swinging frames are transmitted to their coöperating registering-wheels. It will of course be evident that so far as the operation which has been described is concerned this may be effected by a ratchet-and-pawl connection between the swinging frame and its registering-wheel, and such means may be employed without departing from my invention; but in the present instance I have devised novel, and what I believe to be more reliable and efficient, means for the purpose, which of itself constitutes a novel feature of my invention, and which will now be described.

As shown in Figs 4, 10, and 13, each of the registering-wheels is provided upon its right-hand side with a series of holes $m'$, arranged in a circle and at equal distances apart. As shown in Fig. 7, each of the main registering-wheels bears upon its periphery a series of sets of numbers, each set representing the nine digits and a cipher. In the present instance there are six of these sets of numbers upon each wheel, making sixty divisions of the periphery of the wheel, and there are a corresponding number of holes $m'$ in the side of the wheel. As shown in Figs. 1 and 7, there is formed upon or secured to the left-hand side of the arm $G^3$ of each of the swinging frames near its lower end a housing $x$, in which is confined a sliding pin $L^5$. A spring within the housing $x$ presses the pin toward the right and normally projects its right-hand end to the right of the arm $G^3$, as shown in Figs. 1 and 7. If the pin $L^5$ be pressed toward the left against the resistance of its spring, its left-hand end will be projected from its housing $x$ and will enter one of the holes $m'$ in the adjacent registering-wheel, and if the arm $G^3$, carrying the pin, be then swung rearward while the pin is engaged with the hole in the registering-wheel the latter will be turned rearward with the arm $G^3$. Now by the means to be described when the machine is operated by depressing one of the key-levers B the pin $L^5$, carried by the swinging frame corresponding to the group containing such lever, will be forced to the left into engagement with the adjacent registering-wheel before the latch $C^3$, which holds the swinging frame in normal position, is tripped in the manner heretofore described, with the result that when the latch is tripped and the frame released and swung rearward it will turn the registering-wheel and add upon it the value of the operated lever.

Means are provided for maintaining the pin in engagement with the registering-wheel during the rearward movement of the swinging frame and for releasing it and permitting its spring to disengage it from the registering-wheel at the end of the operation, so that the swinging frame may be returned to normal position by its resetting-spring while the registering-wheel remains in the position to which it has been moved. The means for engaging the pin with the registering-wheel and holding it in engagment therewith during the rearward movement of the swinging frame consists of a long curved lever $L^2$, Figs. 4 and 10, which is provided at its rear end with a hub or sleeve $L'$, fitting upon a fixed transverse rod L and having its extreme forward end bent downward and provided at its lower extremity with a laterally-projecting rod or bar $L^3$. There is one of these levers $L^2$ for each registering-wheel and its cooperating set of key-levers, and the laterally-projecting rod or bar $L^3$ of each lever overlies all of the key-levers of one set. These levers $L^2$ are located immediately at the right of the arms $G^3$ of the respective swinging frames, with ther upper edges adjacent and slightly below the right-hand projecting ends of the sliding pins $L^5$, carried by the arms $G^3$. As shown in Figs. 1 and 7, the levers $L^2$ are provided with beveled surfaces $L^4$, adjacent the ends of the sliding pins $L^5$, by means of which whenever one of the levers is lifted its beveled surface $L^4$ will force the adjacent pin $L^5$ to the left and project its extreme left-hand end from its housing $x$ and engage it with one of the holes $m'$ in the adjacent registering-wheel. Now when the front end of any key-lever B is depressed its rear end, engaging the horizontal rod $L^3$ of the corresponding lever $L^2$, will lift the front end of said lever and cause it to force the sliding pin $L^5$ of the corresponding swinging frame to the left and engage it with one of the holes $m'$ in the adjacent registering-wheel, thereby connecting such swinging frame with such wheel, so that when the latch is tripped and the swinging frame released by the further movement of the key-lever the swinging frame as it is swung rearward by its actuating-spring will carry the registering-wheel with it. During such rearward movement of the swinging frame the right-hand end of the pin $L^5$ will ride over the left-hand surface of the lever $L^2$ and be held by the latter in engagement with the registering-wheel. When the operated key-lever is released and the lever $L^2$ permitted to drop back to normal position, the pin $L^5$ will be released and thrown to the right by its spring and its left-hand end thereby disengaged from the registering-wheel, whereupon the swinging frame will be returned to its normal forward position by its resetting-spring, as heretofore described. The registering-wheels are held in the positions to which they are turned by the rearward movements of the swinging frames and backward movement of them prevented by means of holding-pins $m^3$, Figs. 4, 10, 13, and 14. These pins $m^3$ are similar to the sliding pins $L^5$ and are arranged in housings $x'$, carried by brackets $x''$, secured to the forward edge of a fixed cross-bar or plate $H^2$ of the framework. They are normally pressed toward the left by springs within their housings $x'$ and their left-hand ends thereby held in engagement with the holes $m'$ in the adjacent registering-wheels. The left-hand ends of these pins $m^3$ are beveled, as shown at $m^5$ in Fig. 14, to permit the registering-wheels to be turned forward, while preventing backward movement of such wheels. The pins $m^3$ thus take the place of the ordinary holding-pawls of registering-wheels provided with ratchets, while the pins $L^5$ take the place of the ordinary actuating-pawls coöperating with such ratchets.

It will be next in order to describe the transfer or carrying devices between the several registering-wheels, by means of which when any wheel has been turned forward a predetermined distance—in the present instance one-sixth of a revolution—the next higher wheel in the series is advanced one number. The devices employed for this purpose between the two registering-wheels M and O are illustrated in detail in Figs. 13, 14, and 15, and those between the other wheels are substantially the same. As there shown, there is hung upon the rod G, immediately at the right of the wheel O, a rearwardly-extending arm $N^3$, which has formed upon it a housing $v^4$, which contains a spring-pressed sliding pin $n$, Fig. 14, similar to the pin $m^3$ heretofore described. The left-hand end of this pin $n$ is normally engaged with one of the holes in the wheel O, with the result that whenever the rear end of the arm $N^3$ is lifted the wheel O will be turned forward. The left-hand end of the pin $n$ is beveled, as in the case of the pin $m^3$, to permit the wheel O to be turned forward independently of the pin. Within a casing $O'$, fast upon a fixed rod $O''$, is confined a coiled spring whose inner end is secured to said rod $O''$ and whose outer end is secured to a disk $O^2$, loosely mounted upon the rod $O''$ within or adjacent the casing $O'$, Figs. 16 and 17. The disk $O^2$ is connected by a link $O^3$ with the rear end of the arm $N^3$, so that the spring within the casing $O'$ tends to lift the rear end of said arm and turn the wheel O forward. The arm $N^3$ is normally held in its lower position against the stress of such spring by a sliding rod $N'$, mounted in ears or lugs $v'$, depending from a bar or plate $v''$, secured to the forward edge of the frame-plate $H^2$. A spring $N^2$, surrounding the rod $N'$ and suitably engaging it at its left-hand end, presses the rod toward the left and holds its extreme left-hand end projected over the rear end $n'$ of the arm $N^3$, as shown in Fig. 15. When the rod $N'$ is slid to the right against the resistance of the spring $N^2$ and its left-hand end carried from over the arm $N^3$, the rear end of the latter will be lifted by the spring within the casing $O'$ and the wheel $O$ be thereby advanced the space of one number. The extreme right-hand end of the sliding rod $N'$ is pivoted to the lower end of a lever $N$, which is fulcrumed upon the plate $H^2$ or upon the end of the plate $v''$, secured to said plate $H^2$, Fig. 14, and the upper end of this lever $N$ is curved to the right, so as to stand in the path of a series of beveled lugs or projections $m^4$ upon the left-hand side of the registering-wheel $M$. There is one of these projections $m^4$ for each series of numbers upon the wheel $M$, and they are arranged at equal distances apart around the wheel. Whenever any one of these lugs rides under the upper end of the lever $N$, it will rock the latter upon its fulcrum and cause it to withdraw the rod $N'$ from engagement with the arm $N^3$, thereby releasing the latter and permitting its spring to lift it and advance the registering-wheel $O$. In this manner and by these means whenever the registering-wheel $M$ completes one-sixth of a revolution and one of its ciphers is brought to the reading-point the registering-wheel $O$ will be advanced one number to effect the transfer.

The bracket $x''$, which carries the housing $x'$ for the sliding pin $m^3$, heretofore described, also has formed upon it a vertical housing $x^3$, Figs. 13 and 14, in which is mounted a vertically-sliding pin $O^4$, whose lower end normally rests upon the sliding rod $N'$ near the left-hand end of the latter, as shown in Figs. 14 and 15. When the rod $N'$ is drawn to the right in the manner above explained, the pin $O^4$ will drop down behind its left-hand end and prevent return movement of it to the left until the pin $O^4$ is again lifted to normal position. This lifting of the pin $O^4$ is effected by the lifting of the arm $N^3$, the lower end of the pin $O^4$ dropping upon the end of said arm when the rod $N'$ is withdrawn from beneath the pin.

The arm $N^3$ is returned to its lower normal position after having been lifted in the manner described to effect a transfer by means of an arm $p^2$, projecting forward from a sleeve $P'$, mounted upon a rod supported at its opposite ends in ears or lugs $p$ upon the under side of the frame-plate $H^2$, Figs. 2, 4, 10, 13, 14, and 15. The sleeve $P'$ has depending from it a short arm $p'$, the two arms $p'$ and $p^2$ and the sleeve constituting a bell-crank, and the arm $p'$ carries at its lower end a roller $p^3$. The roller $p^3$ stands in rear of an arm $E^5$, formed integral with and projecting vertically from the lever $L^2$ near the rear end of the latter, Fig. 10. Whenever the front end of the lever $L^2$ is lifted by the operation of one of the key-levers $B$, as heretofore explained, the upper end of its arm $E^5$ will be thrown rearward and contact with the roller $p^3$ and rock the bell-crank and throw its forward arm $p^2$ downward, thereby returning the arm $N^3$ to normal position, whereupon it will be reëngaged and held in such position by the rod $N'$. It will of course be understood that there is a set of these restoring devices for each one of the arms $N^3$ of the transfer mechanism.

Having now described the registering mechanism of the machine, it will next be in order to describe the indicating devices by means of which an indication of each amount added upon the registering-wheels is exposed to the view of the customer and bystanders. The indicating-numbers are located upon indicator-wheels $K^5$, Fig. 7, there being one of such wheels for each of the three groups of keys. These wheels are loosely mounted upon a rod $J$, fixed at its opposite ends in vertical supports $j$, $j$, secured at their lower ends to the horizontal frame-plate $H^2$, heretofore described, Figs. 1, 2, and 7. Each wheel $K^5$ has secured to or formed integral with it an extended hub or sleeve $K^4$, and each of these hubs or sleeves has fast upon it a gear-wheel $K$, which meshes with a sliding rack-bar $H$, mounted in a guideway in a horizontal supporting-frame $H'$, which is secured at its lower end upon the frame-plate $H^2$, Figs. 1, 2, 4, 7, 8, 9, and 10, there being three of the supporting-frames $H'$ and three rack-bars $H$ mounted thereon and meshing with the gears $K$ of the respective indicator-wheels $K^5$.

The upper end of the upper arm $G^2$ of each one of the swinging frames mounted upon the rod $G$ is connected with one of the sliding rack-bars $H$, so that whenever the swinging frame is released and its lower end swung rearward by its actuating-spring in the manner heretofore described its upper end will carry the connected rack-bar $H$ forward with it and turn the corresponding indicator-wheel to position to expose to view its number which corresponds to the value of the operated lever $B$ and the particular stop-pin $D$ by which the rearward movement of the lower end of the swinging frame has been arrested. The connection of the swinging frame with the sliding rack-bar is such, as hereinafter described, that the upper end of said frame will carry the rack-bar with it in a forward direction to effect the indication in the manner above described, but will move rearward independently of the rack-bar and indicator-wheel at the resetting movement of the swinging frame, so as to leave the indicator-wheel in position to expose the number which has been brought into view. Suitable springs are applied to the indicator-wheels or the rack-bars meshing with them, which yieldingly hold the indicator-wheels in normal position and which return them to such position when permitted to do so, and suitable latches or holding devices are applied to the wheels or their rack-bars, as hereinafter described, to temporarily hold the wheels in the various indicating positions to which they are moved by the swinging frames. At each operation of the machine the wheels are released from these latches or their holding devices and their springs permitted to return them to or toward normal position preparatory to being turned forward again to effect a new indication, the wheels being thus reset to or toward normal position at the beginning or during the early part of each operation of the machine and then turned forward to effect the new indication and left in the latter position at the end of the operation, all as hereinafter described.

The connection between the arm $G^2$ of each swinging frame and the corresponding rack-bar H consists of a link $g$, pivoted at its front end to the upper end of the arm $G^2$ and having a pin $g^2$ projecting laterally from its rear end and passing through a longitudinal slot $h$ in the rack-bar, Figs. 4 and 8. By means of this connection it will be seen that when the arm $G^2$ of the swinging frame is thrown forward it will carry the rack-bar with it, and that when it is thrown rearward to normal position again the pin $g^2$ will travel freely through the slot $h$ in the rack-bar, so that the latter and the indicator-wheel may remain in the forward position to which they have been moved.

In the present instance the resetting-springs for the indicator-wheels and rack-bars, heretofore referred to, consist of coiled springs confined in casings $K^2$, fast upon the rod J and connected at one end to said rod or the casing and at their opposite ends to the sleeves $K^4$ of the indicator-wheels or to disks secured upon said sleeves adjacent the casings $K^2$, as in the case of the springs and casings heretofore described. Whenever any one of the rack-bars H is slid forward the turning forward of the indicator-wheel whose gear meshes with such rack-bar will put the resetting-spring of such wheel under tension and said spring will tend to return the rack-bar and indicator-wheel to normal position. The gear H of each indicator-wheel is provided with a series of laterally-projecting pins $k$, with which coöperates a latch or holding-pawl $K^3$, Fig. 8, having a spring connected to its lower end which presses its upper forward end $k^2$ upward into engagement with the pins $k$ on the gear K. As the rack-bar H is moved forward and the gear turned in the direction of the arrow, the pins $k$ will slip over the end of the latch $K^3$ and when forward movement of the parts ceases and the swinging frame and link $g$ are moved backward to normal position the engagement of the latch $K^3$ with one or another of the pins $k$ will hold the rack-bar and gear-wheel in the forward position to which they have been moved, with the corresponding number upon the indicator-wheel exposed to view. The rack-bar and the indicator-wheel geared to it will remain in such position against the stress of their resetting-spring until the latch $K^3$ is tripped and disengaged from the pin $k$ on the gear-wheel. Means are provided for disengaging all of the latches from the pins of their coöperating gear-wheels at each operation of the machine, such means consisting of levers $T^3$, fulcrumed on the rod T, supported in brackets T', projecting from the frame-plate $H^2$, as shown in Figs. 2 and 8. The upper end of each of these levers $T^3$ is provided with a laterally-projecting pin $t$, which overlies the forward arm of the adjacent latch $K^3$, so that when the lower end of the lever $T^3$ is swung rearward the pin $t$ will depress the front end of the latch $K^3$ and disengage it from the pin $k$ on the gear-wheel K and thereby release the latter and the indicator-wheel and rack-bar and permit their resetting-spring to restore them to normal position. The lower ends of all of the levers $T^3$ are thrown rearward at each operation of the machine to effect the release of the indicators by means of a rod or bar $S^2$, extending transversely across the rear side of the machine immediately in front of the levers $T^3$, Figs. 2 and 4, and hung at its opposite ends by upwardly and forwardly extending side arms to the opposite ends of the frame-plate $H^2$. Near one end this horizontal rod $S^2$ has depending from it an arm S', to whose lower end is connected the rear end of a rod S, extending forward to the front of the machine and having a downwardly-bent forward end, Figs. 4 and 18. At each operation of the machine the rod S is forced rearwardly by the opening of the cash-receptacle, hereinafter described, and the horizontal rod $S^2$ thereby caused to press the lower ends of all of the levers $T^3$ rearward and disengage the latches $K^3$ from all of the indicator-wheels and permit the resetting-springs of the latter to restore them to normal position.

The cash-receptacle is shown in Fig. 18 as consisting of a fixed box located in the lower forward part of the casing and adapted to be closed by a curved lid $A^2$, supported by arms $A^3$, pivoted at their lower ends to the sides of the receptacle. Springs $A^4$, wound around the pivots of the arms $A^3$ and engaging the latter, tend to throw the lid $A^2$ rearward and open the receptacle to permit access to its contents. The lid $A^2$ is normally held in closed position against the stress of the springs $A^4$ by latch-arms $u$, pivoted to the opposite sides of the casing of the machine and at their front ends engaging the rear edge of the lid $A^2$ and having their rear ends connected by a cross-bar U, underlying all of the key-levers B, immediately in front of their fulcrum-rod $b$. A coiled spring connected to the bar U pulls the latter upward and yieldingly holds the front ends of the arms $u$ in engagement with the rear edge of the lid $A^2$. When any one of the key-levers is depressed, the bar U will be forced downward and the front ends of the arms $u$ disengaged from the lid $A^2$ and the springs $A^4$ permitted to swing the lid rearward to the position indicated by the dotted lines in Fig. 18. At the beginning of such rearward movement the rear edge of the lid will contact with the downwardly-bent forward end of the rod S and force the latter rearward until the lid clears the end of the rod, after which the rod S will return to its normal forward position, its front end being free to rise and ride over the surface of the lid in such movement. The rearward movement given the rod S by the contact of the lid with its forward end will swing the horizontal rod S² rearward to the position indicated by the dotted lines in Fig. 18, and thereby cause the levers T³ to disengage the latches K³ from the indicator-wheels, as before explained.

In the manner and by the means above described the latches for all of the indicator-wheels will be tripped and the wheels released at each opening of the cash-receptacle by the operation of any one of the key-levers in either of the groups or sets. There is also provided at the right-hand side of the key-levers B a special key or lever B⁵, bearing upon its front end a plate marked "Change" and provided with an arm or plate B⁶, projecting to the left over the side arm $u$ of the bar U of the lid-releasing mechanism, so that whenever the front end of the lever B⁵ is depressed the lid of the money-receptacle will be released and then thrown rearward by its spring, and will contact with the front end of the rod S and trip the latches of the indicator-wheels, just as when the money-receptacle is opened by the operation of one of the numbered or cash key-levers B, in the manner heretofore explained. By means of the special key-lever B⁵, therefore, the money-receptacle may be opened and the indicator-wheels be released and return to their normal positions independently of the operation of the cash or numbered key-levers B.

As an additional or alternative means for releasing the indicator-wheels independently of the opening of the cash-receptacle the following devices are employed, reference being had to Figs. 2, 4, and 10: As best shown in Fig. 10, each of the sleeves or hubs $f$ of the disks $f'$, to which are secured the coiled springs within the casings $f^2$, Fig. 4, has secured to or formed integral with it a rearwardly-projecting arm V, which arm, together with the arm projecting forwardly of said hub or sleeve and having connected to it the lower end of the link $f^3$, heretofore described, constitute a lever fulcrumed upon the rod F. The front end of each one of these levers is connected by one of the links $f^3$ with the corresponding lever E², so that when the front end of a lever B in any one of the groups or sets is depressed to its limit of movement the lever-arm V will be swung downward and forward to the position shown in dotted lines in Fig. 10. Now each of the arms V coöperates with one of the indicator-releasing levers T³, to which end each of said levers is provided upon the right-hand side of its lower end with a laterally-projecting flange or wiper-block T⁴, having its upper and lower ends beveled in the same direction, as shown. Each of the arms V is provided upon the left-hand side of its rear end with a lug or projection $v$, adapted to coöperate with the flange T⁴ on the adjacent lever T³, Fig. 2. When the rear end of the arm V is thrown downward by the depression of the front end of a key-lever B in the corresponding group of levers, its projection $v$ will contact with the upper end of the flange T⁴ of the adjacent lever T³ and ride downward over the forward face of said flange, thereby forcing the lower end of the lever T³ rearward and causing its upper end to trip the latch K³ of the corresponding indicator-wheel. When the projection $v$ on the arm V clears and passes below the flange T⁴ on the lever T³, (dotted lines, Fig. 10,) the lower end of the lever T³ will swing forward again and permit the spring connected to the latch K³ of the indicator-wheel to restore said latch to normal position ready to reëngage the wheel and hold it in its new indicating position. When the depressed key-lever B is released and the resetting-spring within the casing $f^2$ permitted to restore the parts to normal position, the projection $v$ upon the rear end of the arm V, as the latter is swung upward to normal position, will contact with the lower beveled end of the flange T⁴ on the lever F³ and ride upward over the rear side of the same, forcing the lower end of the lever T³ slightly forward until it clears the upper end of said flange, whereupon the lever will be released and swung slightly rearward to normal position.

In the manner and by the means above described at the depression of any key-lever B the latch of the corresponding indicator-wheel will be tripped and the wheel be returned by its resetting-spring to or toward normal position, whence it will be carried forward to indicate the value of the operated key-lever in the manner heretofore explained, and thus the release and resetting of the indicator-wheels will be effected even if the lid of the money-receptacle be not opened and closed at each operation of the machine. Where, however, the money-receptacle is opened and closed at each operation of the machine, the release of all of the indicator-wheels will be effected at each opening of the receptacle, whether by one of the numbered keys or by the special key above described, and in such event the individual releasing devices intermediate each group of keys and its corresponding indicator-wheel might be dispensed with.

In order that when a key-lever B in any group is depressed not only the indicator-wheel corresponding to such group may be released by the means last above described, but also the wheel or wheels at the left thereof representing higher denominations, the laterally-projecting rods or bars E⁴ of the levers E² are made to overlap at their adjacent ends, as shown in Fig. 19, so that when any one of the levers E² is lifted by the depression of a key-lever B in the corresponding group the lever or levers E² at the left of such lever will be likewise lifted and the corresponding indicator wheel or wheels released, as will be readily understood.

For the purpose of preventing any rack-bar H and the indicator-wheel geared thereto from being thrown too far forward by the action of their connected swinging frame and thereby causing a larger amount to be indicated than was intended the means shown in Figs. 8 and 9 are employed. As there shown, one of the side walls of the groove in the frame H', in which the rack-bar H slides backward and forward, is provided with a series of concave depressions $h^3$, and the rack-bar has pivoted to its side, near its forward end, a rearwardly-extending arm $h'$, which is provided at its extreme rear end with a lateral projection $h^2$, adapted to rest in and travel over the notches $h^3$ in the frame H'. The pin $g^2$ of the link $g$, which extends through the slot $h$ in the rack-bar H, as heretofore described, carries upon the opposite side of the rack-bar from the link $g$ a block $g'$, having an abrupt rear side and a beveled or rounded forward side. In the forward movement of the parts the lateral projection $h^2$ on the arm $h'$ will travel immediately behind the block $g'$ as said projection rides over the points or elevations between the notches $h^3$, and will contact with the rear side of the block $g'$ at the end of the forward movement of the parts and prevent the rack-bar moving any farther forward than does the block $g'$, and as the latter is connected by the link $g$ to the swinging frame it follows that the rack-bar and the indicator-wheel geared to it cannot move any farther forward than is permitted by the movement of the swinging frame, and any excess of movement due to their own momentum is thereby prevented. At the end of the forward movement of the parts the projection $h^2$ comes to rest in one of the notches $h^3$ and lies below the path of travel of the block $g'$ as the latter returns to normal position, so that it does not interfere with the resetting of the parts.

For the purpose of locking the key-levers in normal position when desired and for releasing them at will the following devices are employed: Immediately in rear of and slightly above the rear ends of the key-levers is a bar $Q^4$, Fig. 4, extending transversely across the machine, as seen in Fig. 2, and provided at its opposite ends with upwardly-extending side arms, which are pivoted at their upper ends to the framework of the machine at points in advance of the normal position of the bar $Q^4$, so that when permitted to do so said bar will swing forward over the rear ends of the key-levers and lock them from upward movement. The bar $Q^4$ is normally held in rearward position by a latch $Q^5$, Fig. 4, pivoted at its rear end to a bracket-arm $Q^6$, projecting rearward from the framework and having its front end bent downwardly to form a hook which engages the upper edge of the bar $Q^4$. When the front end of this latch $Q^5$ is lifted and the bar $Q^4$ released, the bar will swing forward over the rear ends of the key-levers. The latch $Q^5$ is provided at its front end, above its hook which engages the bar $Q^4$, with a recess $q^2$, through which extends a transverse rod or bar $Q^3$, which bar, as seen in Fig. 2, extends entirely across the machine and is supported at its opposite ends by short upwardly and forwardly extending side arms pivoted to the framework. As shown in Fig. 4, the left-hand one of these two side arms of the bar $Q^3$ is extended forwardly and downwardly beyond its pivot and forms a curved arm $Q^2$. This arm $Q^2$ is engaged by a pin $q'$, projecting laterally from the upper end of a short arm or plate $Q'$, pivoted at its lower end to a support depending from the framework and having connected to it the rear end of a forwardly and upwardly extending rod or wire $Q^9$, whose extreme forward end is provided with a push-button $q$. When the button $q$ and rod $Q^9$ are pressed rearward, the bar $Q^3$ will be swung upward and will lift the latch $Q^5$ out of engagement with the bar $Q^4$ and permit the latter to swing forward over the ends of the key-levers and lock them.

For the purpose of also restoring the bar $Q^4$ to normal position and releasing the key-levers by pressing the rod $Q^9$ rearward the following means are employed: With the bar $Q^4$ in extreme forward locking position, as indicated in dotted lines in Fig. 11, if the rod $Q^9$ be pressed rearward to its limit of movement the lower end of the arm $Q^2$ will engage the forward side of the bar $Q^4$ and swing the latter rearward to normal position. The same movement of the parts which thus returns the bar $Q^4$ to normal position will, however, lift the latch $Q^5$ entirely away from said bar, so that it cannot then reëngage the bar to hold it in normal position. For the purpose of holding the bar $Q^4$ in normal position when thus returned thereto and before it can be reengaged by the latch $Q^5$ there is provided a second latch $Q^7$, pivoted at $q^6$ to the bracket-arm $Q^6$ and provided at its forward end with a hook or shoulder adapted to catch over the upper edge of the bar $Q^4$. The latch $Q^5$ is provided upon its left-hand side with a stud or pin $q^3$, which overlies the rear end or tail of the latch $Q^7$. When the latch $Q^5$ is in normal position, the contact of this pin $q^3$ with the rear end of the latch $Q^7$ will hold the front end of the latter elevated above the upper edge of the bar $Q^4$ in inoperative position. Whenever the front end of the latch $Q^5$ is lifted, however, in the manner heretofore described the front end of the latch $Q^7$ will be permitted to drop slightly into position to engage the bar $Q^4$ when the latter is swung rearward to normal position. When the rod $Q^9$ is pushed rearward to its limit of movement, therefore, for the purpose of restoring the bar $Q^4$ to normal position, said bar will be caught and held by the latch $Q^7$ until the latch $Q^5$ is permitted to return to normal position, whereupon the latch $Q^5$ will trip the latch $Q^7$ and disengage it from the bar $Q^4$, itself engaging the bar and holding it in normal position after it has been released by the latch $Q^7$.

It will be understood from the foregoing that upon pressing the rod $Q^9$ slightly rearward, just sufficiently to disengage the latch $Q^5$ from the bar $Q^4$, the latter will be released and will swing forward over the rear ends of the key-levers and lock them, while upon pressing the rod $Q^9$ farther rearward to its limit of movement the bar $Q^4$ will be restored to and latched in normal position and the key-levers unlocked.

For the purpose of preventing simultaneous depression of two or more keys in the same set or group there is provided a locking-plate R for each set of keys, the several locking-plates being arranged side by side in a transverse guideway upon the framework beneath the key-levers B and immediately in front of their fulcrum-rod $b$, Figs. 4, 5, 6, and 7. As best shown in Fig. 6, each of these plates R is provided upon its upper edge with a series of projections $r$, having their corners cut away to form inclined surfaces. It will also be seen that the surfaces of these projections beneath each two alternate key-levers are inclined in opposite directions, so that if it be attempted to simultaneously depress any two alternate keys they will be arrested by contact with the projections $r$ of the plate R. Simultaneous depression of any two alternate key-levers in a given set or group is thus prevented. The construction shown would not prevent the simultaneous depression of two adjacent keys, as they would contact with surfaces inclined in the same direction and would simply slide the plate R in the opposite direction as they were pressed downward, as will be the case where a single lever is depressed; but inasmuch as the upper forward ends of the alternate levers are arranged in two separate horizontal rows or banks, as shown in Figs. 1 and 4, and inasmuch as the only keys which are liable to be accidentally or inadvertently depressed together are those whose finger-buttons are immediately adjacent each other, side by side, and inasmuch as the adjacent finger-buttons in each row or bank are upon alternate levers, it follows that the provision of means for preventing simultaneous depression of alternate levers in the same set or group sufficiently answers the purpose of preventing the accidental or inadvertent depression of two key-levers in the same set at the same time. The locking-plates R are yieldingly held in and returned to normal position by springs $R'$.

Having thus fully described my invention, I claim—

1. In a cash-register, the combination of a plurality of registering-wheels turning upon a common axis, a plurality of swinging frames hung upon the same axis and tending to move from normal position, means for holding the frames in normal position and releasing them at will, a plurality of sets of stops, one set for each swinging frame and registering-wheel, the stops of each set being adapted to be severally moved into the path of the corresponding swinging frame to arrest it at different points in its movement from normal position, and connections between the respective swinging frames and their coöperating registering-wheels for causing the frames to turn the wheels with them in one direction and not in the other.

2. In a cash-register, the combination of a plurality of registering-wheels turning on a common axis, a plurality of swinging frames hung upon the same axis and tending to move from normal position, a plurality of sets of stops, one set for each swinging frame and registering-wheel, the stops of each set being adapted to be severally moved into the path of the corresponding swinging frame to arrest it at different points in its movement from normal position, a plurality of latches coöperating with the respective swinging frames to hold them in normal position, each of said latches being adapted to be disengaged from its coöperating frame by the act of moving one or another of the corresponding stops into the path of said frame, and connections between the swinging frames and registering-wheels for causing the frames to turn the wheels with them in one direction and not in the other.

3. In a cash-register, the combination of a plurality of registering-wheels turning upon a common axis, a plurality of swinging frames hung upon the same axis and tending to move from normal position, a plurality of latches coöperating with the respective frames to hold them in normal position, a plurality of sets of stops, one set for each swinging frame and registering-wheel, the stops of each set being adapted to be severally moved into the path of the corresponding swinging frame to arrest it at different points in its movement from normal position, a plurality of sets of key-levers coöperating with the stops and with the latches of the swinging frames, to move the stops into the paths of the frames and to disengage the latches from said frames, and connections between the respective frames and their registering-wheels for causing the frames to turn the wheels with them in one direction and not in the other.

4. In a cash-register, the combination of a plurality of registering-wheels turning upon a common axis and adapted to register different denominations of value, a plurality of swinging frames hung upon the same axis and tending to move from normal position, means for holding the frames in normal position and releasing them at will, a plurality of sets of stops, one set for each swinging frame and registering-wheel, the stops of each set being adapted to be severally moved into the path of the corresponding swinging frame to arrest it at different points in its movement from normal position, connections between the respective swinging frames and their coöperating registering-wheels for causing the frames to turn the wheels with them in one direction and not in the other, and transfer or carrying devices intermediate the several wheels for causing each wheel to be advanced one number at the end of a predetermined movement of the next lower wheel in the series.

5. In a cash-register the combination of a plurality of registering-wheels turning upon a common axis and adapted to register different denominations of value, each wheel bearing a series of sets of numbers of which each set represents the nine digits and a cipher, a plurality of swinging frames hung upon the same axis as the registering-wheels and tending to move from normal position, a plurality of sets of stops, one set for each swinging frame and registering-wheel and each set containing nine stops located along the path of travel of the corresponding swinging frame at nine different distances from its initial position, the stops of each set being adapted to be severally moved into the path of the corresponding swinging frame to arrest it at different points in its movement from normal position, a plurality of latches for holding the swinging frames in normal position, each latch being adapted to be disengaged from its coöperating frame by the act of moving one of the stops into the path of said frame, connections between the respective swinging frames and registering-wheels for causing the frames to turn the wheels with them in one direction and not in the other, and carrying devices intermediate the several wheels for causing each wheel to be advanced one number at the end of a predetermined movement of the next lower wheel in the series.

6. In a cash-register, the combination of a plurality of registering-wheels turning upon a common axis, a plurality of swinging frames hung upon the same axis and tending to move from normal position, means for holding the frames in normal position and releasing them at will, a plurality of sets of stops, one set for each swinging frame and registering-wheel, the stops of each set being adapted to be severally moved into the path of the corresponding swinging frame to arrest it at different points in its movement from normal position, a sliding pin carried by each swinging frame and adapted to be engaged with and disengaged from holes in the corresponding registering-wheel, and means for engaging such pins with the registering-wheels at the end of the movements of the swinging frames in one direction and disengaging them therefrom at the ends of their movements in the opposite direction, to cause the swinging frames to turn the registering-wheels with them in one direction and not in the other.

7. In a cash register and indicator, the combination of an indicator-wheel movable back and forth toward and from normal position and bearing a series of indicating-numbers, a swinging frame tending to move from normal position, a plurality of stops adapted to be severally moved into the path of the frame to arrest it at different points, and a connection between the swinging frame and indicator-wheel whereby the frame is caused to turn the wheel as the frame moves in one direction but is permitted to move in the opposite direction independently of the wheel.

8. In a cash register and indicator, the combination of an indicator-wheel bearing a series of indicating-numbers, a swinging frame tending to move from normal position, a plurality of stops adapted to be severally moved into the path of such frame to arrest it at different points, a reciprocating rack geared to the indicator-wheel, and a connection between said rack and the swinging frame whereby the frame is caused to move the rack and turn the indicator-wheel as the frame moves in one direction but is permitted to move in the opposite direction independently of the rack and wheel.

9. In a cash register and indicator, the combination of a rotary indicator-wheel bearing a series of indicating-numbers, a resetting-spring for said wheel tending to hold it in and return it to normal position, a swinging frame tending to move from normal position, a plurality of stops adapted to be severally moved into the path of said frame to arrest it at different points, a connection between said frame and indicator-wheel whereby the frame is caused to turn the wheel as the frame is moved in one direction but is permitted to move in the opposite direction independently of the wheel, and a latch for holding the indicator-wheel in the position to which it is turned by the movement of the swinging frame.

10. In a cash register and indicator, the combination of an indicator-wheel bearing a series of indicating-numbers, a resetting-spring therefor tending to hold the wheel in and return it to normal position, a swinging frame and a spring tending to move it from normal position, said spring being of sufficient power to overcome the resistance of the indicator-wheel spring and put the latter under tension, a plurality of stops adapted to be severally moved into the path of the swinging frame, to arrest the latter at different points, a connection between the swinging frame and indicator-wheel whereby when the frame is moved by its spring it turns the indicator-wheel and puts the latter's spring under tension, but is permitted to return to normal position independently of the indicator-wheel, and a latch for holding the indicator-wheel in the position to which it has been turned by the swinging frame.

11. In a cash register and indicator, the combination of an indicator-wheel bearing a series of indicating-numbers, a swinging frame tending to move from normal position, a connection between the swinging frame and indicator-wheel whereby the swinging frame is caused to turn the indicator-wheel with it as it moves in one direction but is permitted to move in the opposite direction independently of the wheel, a plurality of stops adapted to be severally moved into the path of the swinging frame, to arrest the latter at different points, and a latch for holding the swinging frame in normal position, said latch being adapted to be disengaged from the swinging frame by the act of moving one or another of the stops into the path of the swinging frame.

12. In a cash register and indicator, the combination of an indicator-wheel bearing a series of indicating-numbers, a swinging frame tending to move from normal position, a connection between the swinging frame and indicator-wheel by which the swinging frame is caused to turn the indicator-wheel with it as it moves in one direction, but is permitted to move in the opposite direction independently of the wheel, a plurality of stops adapted to be severally moved into the path of the swinging frame to arrest the latter at different points, a latch for holding the swinging frame in normal position, and a plurality of key-levers coöperating with the stops and with the latch, to move the stops into the path of the swinging frame and to disengage the latch from said frame.

13. In a cash register and indicator, the combination of an indicator-wheel bearing a series of indicating-numbers, a resetting-spring therefor tending to hold the wheel in and return it to normal position, a latch adapted to hold the wheel in the different positions to which it may be moved against the resistance of its resetting-spring, a swinging frame and a spring tending to move it from normal position, a connection between said frame and indicator-wheel whereby the frame is caused to turn the wheel and to put its spring under tension as the frame moves from normal position but is permitted to return to normal position independently of the wheel, a plurality of stops adapted to be severally moved into the path of the swinging frame, to arrest the latter at different points, and a latch for holding the swinging frame in normal position and adapted to be disengaged from said frame by the act of moving one or another of the stops into the path of the swinging frame.

14. In a cash register and indicator, the combination of a plurality of indicator-wheels bearing indicating-numbers representing different denominations of value, a plurality of swinging frames tending to move from normal position, connections between the respective frames and indicator-wheels whereby the frames are caused to turn the wheels as the frames move in one direction but are permitted to move in the opposite direction independently of the wheels, and a plurality of sets of stops, one set for each of the swinging frames and indicator-wheels, the stops of each set being adapted to be severally moved into the path of the corresponding swinging frame, to arrest the latter at different points in its movement from normal position.

15. In a cash register and indicator, the combination of a plurality of indicator-wheels bearing indicating-numbers representing different denominations of value, a plurality of swinging frames tending to move from normal position, connections between the respective frames and indicator-wheels whereby the frames are caused to turn the wheels as the frames move in one direction but are permitted to move in the opposite direction independently of the wheels, a plurality of sets of stops, one set for each of the swinging frames and indicator-wheels, the stops of each set being adapted to be severally moved into the path of the corresponding swinging frame, to arrest the latter at different points in its movement from normal position, and a plurality of latches for holding the swinging frame in normal position, each of said latches being adapted to be disengaged from its coöperating frame by the act of moving one of the stops into the path of such frame.

16. In a cash register and indicator, the combination of a plurality of indicator-wheels bearing indicating-numbers representing different denominations of value, a plurality of swinging frames tending to move from normal position, connections between the respective frames and indicator-wheels whereby the frames are caused to turn the wheels as the frames move in one direction but are permitted to move in the opposite direction independently of the wheels, a plurality of sets of stops, one set for each of the swinging frames and indicator-wheels, the stops of each set being adapted to be severally moved into the path of the corresponding swinging frame, to arrest the latter at different points in its movement from normal position, a plurality of latches for holding the swinging frames in normal position, and a plurality of sets of key-levers, one set for each set of stops and coöperating therewith and with the latch of the corresponding swinging frame, to move the stops into the paths of the swinging frames and to disengage the latches from said frames.

17. In a cash register and indicator, the combination of a plurality of indicator-wheels bearing indicating-numbers representing different denominations of value, resetting-springs for the respective wheels tending to hold them in and return them to normal position, means for temporarily holding them in the different positions to which they may be moved against the resistance of their springs, a plurality of swinging frames, springs acting upon said frames and tending to move them from normal position, connections between said frames and the indicator-wheels whereby the frames are caused to turn the wheels as the frames are moved in one direction but are permitted to move in the opposite direction independently of the wheels, a plurality of sets of stops, one set for each swinging frame and indicator-wheel, the stops of each set being adapted to be severally moved into the path of the corresponding swinging frame, to arrest the latter at different points in its movement from normal position, and a plurality of latches for holding the respective frames in normal position, one of said latches corresponding to each set of stops and adapted to be released by the act of moving any one of the stops of its set into the path of the corresponding swinging frame.

18. In a cash register and indicator provided with a money-receptacle adapted to be opened at each operation of the machine, the combination of an indicator-wheel bearing a series of indicating-numbers, a resetting-spring for holding said wheel in and returning it to normal position, a swinging frame tending to move from normal position, a plurality of stops adapted to be severally moved into the path of said frame to arrest it at different points, a connection between said frame and indicator-wheel by which the frame is caused to turn the wheel as the frame is moved in one direction but is permitted to move in the opposite direction independently of the wheel, a latch for holding the indicator-wheel in the position to which it is turned by the swinging frame, and means operating in connection with the opening of the money-receptacle to trip said latch and release the indicator-wheel at the opening of said receptacle.

19. In a cash register and indicator having a normally closed and locked money-receptacle, the combination of an indicator-wheel bearing a series of numbers, a resetting-spring for said wheel tending to hold it in and return it to normal position, a swinging frame tending to move from normal position, a plurality of stops adapted to be severally moved into the path of said frame to arrest it at different points in its movement from normal position, a latch for holding the swinging frame in normal position, said latch being adapted to be disengaged from the frame by the act of moving any one of the stops into the path of such frame, a connection between the swinging frame and indicator-wheel by which the frame is caused to turn the indicator-wheel with it as it moves from normal position but is permitted to turn to normal position independently of the wheel, a latch for holding the indicator-wheel in the position to which it is moved by the swinging frame, and a special key and connections for opening the money-receptacle and tripping the latch of the indicator-wheel, whereby upon operating such key the money-receptacle may be opened and the indicator-wheel released and its spring permitted to return it to normal position.

20. In a cash register and indicator having a normally closed and locked money-receptacle, the combination of an indicator-wheel bearing a series of indicating-numbers, a resetting-spring for said wheel tending to hold it in and return it to normal position, a swinging frame tending to move from normal position, a plurality of stops adapted to be severally moved into the path of said frame to arrest it at different points, a plurality of numbered or cash keys for moving said stops into the path of the frame, a connection between said frame and indicator-wheel whereby the frame is caused to turn the wheel as the frame is moved in one direction but permitted to move in the opposite direction independently of the wheel, a latch for holding the indicator-wheel in the position to which it is turned by the movement of the swinging frame, and a special key and connections for opening the money-receptacle and tripping the latch of the indicator-wheel, whereby upon operating such special key the money-receptacle may be opened and the indicator released and restored to normal position by its spring.

21. In a cash register and indicator having a normally closed and locked money-receptacle, the combination of a plurality of indicator-wheels bearing indicating-numbers representing different denominations of value, resetting-springs for the respective wheels tending to hold them in and return them to normal position, latches adapted to hold said wheels in the different positions to which they may be moved against the resistance of their springs, a plurality of swinging frames tending to move from normal position, connections between said frames and the indicator-wheels by which the frames are caused to turn the wheels as the frames are moved in one direction but are permitted to move in the opposite direction independently of the wheels, a plurality of sets of stops, one set for each swinging frame and indicator-wheel, the stops of each set being adapted to be severally moved into the path of the corresponding swinging frame to arrest it at different points in its movement from normal position, a plurality of latches for holding the respective frames in normal position, each latch being adapted to be disengaged from its coöperating frame by the act of moving one of the stops into the path of said frame, and a special key and connections for opening the money-receptacle and tripping the latches of the indicator-wheels, whereby upon operating such key the money-receptacle may be opened and the indicator-wheels be released and their springs permitted to return them to normal position.

22. In a cash register and indicator having a normally closed and locked money-receptacle, the combination of a plurality of indicator-wheels bearing indicating-numbers representing different denominations of value, resetting-springs for the respective wheels tending to hold them in and return them to normal position, latches adapted to hold said wheels in the different positions to which they may be moved against the resistance of their springs, a plurality of swinging frames tending to move from normal position, connections between said frames and the indicator-wheels by which the frames are caused to turn the wheels as the frames are moved in one direction but are permitted to move in the opposite direction independently of the wheels, a plurality of sets of stops, one set for each swinging frame and indicator-wheel, the stops of each set being adapted to be severally moved into the path of the corresponding swinging frame to arrest it at different points in its movement from normal position, a plurality of latches for holding the respective frames in normal position, a plurality of sets of numbered or cash keys, one set for each set of stops and coöperating therewith and with the latch of the corresponding register-frame, to move the stops into the path of said frame and to disengage the latch from the frame, and a special key and connections for opening the money-receptacle and tripping the latches of the indicator-wheels.

23. In a cash register and indicator, the combination of a plurality of register-wheels mounted upon a transverse central shaft, a plurality of swinging frames hung upon said shaft, means for moving said frames from normal position, a plurality of sets of stops, one set for each swinging frame and register-wheel, and the stops in each set being adapted to be severally moved into the path of the corresponding swinging frame to arrest it at different points in its movement from normal position, connections between the several swinging frames and registering-wheels by which the frames are caused to turn the wheels with them in one direction and not in the other, a plurality of indicator-wheels mounted upon a separate shaft above and parallel with the register-wheel shaft, and connections between the several swinging frames and indicator-wheels by which the frames are caused to turn the indicator-wheels as the frames move in one direction but not in the other.

24. In a cash register and indicator, the combination of a plurality of registering-wheels mounted upon a transverse central shaft, a plurality of swinging frames hung upon said shaft, means for moving said frames from normal position, a plurality of sets of stops, one set for each swinging frame and registering-wheel, and the stops in each set being adapted to be severally moved into the path of the corresponding swinging frame to arrest it at different points in its movement from normal position, connections between the several swinging frames and registering-wheels by which the frames are caused to turn the wheels with them in one direction and not in the other, a plurality of indicator-wheels mounted upon a separate shaft above and parallel with the register-wheel shaft, connections between the several swinging frames and indicator-wheels by which the frames are caused to turn the wheels as the frames move in one direction but not in the other, resetting-springs for the indicating-wheels tending to hold them in and return them to normal position, and means for temporarily holding the indicator-wheels in the positions to which they are moved by the swinging frames.

25. In a cash register and indicator, the combination of a plurality of register-wheels mounted upon a transverse central shaft, a plurality of swinging frames mounted upon said shaft, springs tending to move said frames from normal position, means for holding said frames in normal position and releasing them at will, a plurality of sets of stops, one set for each swinging frame and register-wheel and the stops of each set being adapted to be severally moved into the path of the corresponding swinging frame to arrest the latter at different points in its movement from normal position, connections between the several swinging frames and register-wheels for causing the frames to turn the wheels with them in one direction but not in the other, a plurality of indicator-wheels mounted upon another shaft above and parallel with the first-mentioned shaft, connections between the several swinging frames and indicator-wheels for causing the frames to turn the wheels as the frames are moved in one direction but not in the other, resetting-springs for the indicator-wheels tending to hold them in and return them to normal position, and means for temporarily holding the indicator-wheels in the positions to which they are turned by the swinging frames.

26. In a cash register and indicator, the combination of a plurality of register-wheels mounted upon a transverse central shaft, a plurality of swinging frames mounted upon said shaft, springs tending to move said frames from normal position, a plurality of sets of stops, one set for each swinging frame and register-wheel and the stops of each set being adapted to be severally moved into the path of the corresponding swinging frame to arrest it at different points in its movement from normal position, a plurality of latches for holding the swinging frames in normal position, each of said latches being adapted to be disengaged from its coöperating frame by the act of moving one of the stops into the path of such frame, connections between the several swinging frames and register-wheels for causing the frames to turn the wheels with them as the frames move in one direction and not in the other, a plurality of indicator-wheels mounted upon a separate shaft above and parallel with the first-mentioned shaft, connections between the several swinging frames and indicator-wheels by which the frames are caused to turn the said wheels as the frames move from normal position but are permitted to return to normal position independently of the wheels, resetting-springs for the indicator-wheels tending to hold them in and return them to normal position, and means for temporarily holding said wheels in the positions to which they are moved by the swinging frames.

27. In a cash register and indicator, the combination of a plurality of register-wheels mounted upon a transverse central shaft, a plurality of swinging frames hung upon said shaft, springs tending to move said frames from normal position, means for holding the frames in normal position and releasing them at will, a plurality of sets of stops, one set for each swinging frame and registering-wheel and the stops of each set being adapted to be severally moved into the path of the corresponding swinging frame to arrest the latter at different points in its movement from normal position, connections between the several swinging frames and register-wheels for causing the frames to turn the wheels with them in one direction and not in the other, a plurality of indicator-wheels mounted upon a separate shaft above and parallel with the first-mentioned shaft and each provided with a gear, a plurality of reciprocating rack-bars meshing with the gears of the respective indicator-wheels, and connections between the several swinging frames and rack-bars by which the frames are caused to move the rack-bars and indicator-wheels as the frames are moved from normal position but are permitted to return to normal position independently of the rack-bars and indicator-wheels.

28. In a cash register and indicator, the combination of a plurality of register-wheels mounted upon a transverse central shaft, a plurality of swinging frames hung upon said shaft, springs tending to move said frames from normal position, means for holding the frames in normal position and releasing them at will, a plurality of sets of stops, one set for each swinging frame and register-wheel and the stops of each set being adapted to be severally moved into the path of the corresponding swinging frame to arrest the latter at different points in its movement from normal position, connections between the several swinging frames and register-wheels for causing the frames to turn the wheels with them in one direction and not in the other, a plurality of indicator-wheels mounted upon a separate shaft above and parallel with the first-mentioned shaft and each provided with a gear, a plurality of reciprocating rack-bars meshing with the gears of the respective indicator-wheels, connections between the several swinging frames and rack-bars by which the frames move the rack-bars and indicator-wheels with them as the frames are moved from normal position but are permitted to return to normal position independently of the rack-bars and indicator-wheels, resetting-springs for the rack-bars and indicator-wheels tending to hold said bars and wheels in and return them to normal position, and means for temporarily holding the rack-bars and indicator-wheels in the positions to which they are moved by the swinging frames.

29. In a cash register and indicator, the combination of a plurality of indicator-wheels, resetting-springs therefor tending to hold the wheels in and return them to normal position, a plurality of stronger actuating-springs adapted to turn the indicator-wheels from normal position and put their resetting-springs under tension, a plurality of sets or groups of keys and connections, one for each indicator-wheel, for determining the movements of said wheels by their actuating-springs, and means for temporarily holding the indicator-wheels in the positions to which they are moved by said actuating-springs.

30. In a cash register and indicator, the combination of a plurality of register-wheels, a plurality of actuating-springs therefor, a plurality of indicator-wheels corresponding to the register-wheels and actuated by the same springs, resetting-springs for the indicator-wheels adapted to be overcome and put under tension by the actuating-springs when the latter turn the indicator-wheels from normal position, a plurality of sets or groups of keys and connections, one for each register and indicator wheel, for determining the movements imparted to said wheels by the actuating-springs, and means for temporarily holding the indicator-wheels in the positions to which they are moved by said actuating-springs.

31. In a cash register and indicator, the combination of a plurality of movable frames or members, a plurality of actuating-springs for moving said frames from normal position, a plurality of sets or groups of keys, one set for each frame, for determining the movements of said frames by their actuating-springs, a plurality of register-wheels moved by the respective frames in one direction and not in the other, a plurality of indicator-wheels also moved by the respective frames in one direction but not in the other, resetting-springs for the indicator-wheels put under tension at the movement of said wheels from normal position by the main actuating-springs, and means for temporarily holding the indicator-wheels in the positions to which they are moved by said springs.

32. In a cash register and indicator, the combination of a plurality of movable frames or members, means for moving said frames from normal position, a plurality of sets of stops, one set for each frame and the stops of each set being adapted to be severally moved into the path of the corresponding frame to arrest it at different points in its movement from normal position, a plurality of register-wheels cooperating with the respective frames and moved by them in one direction and not in the other, a plurality of indicator-wheels also cooperating with the respective frames and likewise moved by them in one direction but not in the other, resetting-springs for the indicator-wheels tending to hold them in and return them to normal position, and means for temporarily holding the indicator-wheels in the positions to which they are moved by said frames.

33. In a cash register and indicator, the combination of a plurality of movable frames or members, means for moving said frames from normal position, a plurality of sets of stops, one set for each frame and the stops of each set being adapted to be severally moved into the path of the corresponding frame to arrest it at different points in its movement from normal position, a plurality of sets or groups of key-levers, one set or group for each set of stops and coöperating therewith to project the stops into the paths of the movable frames, a plurality of registering-wheels coöperating with the respective frames and moved by them in one direction and not in the other, a plurality of indicator-wheels also coöperating with the respective frames and likewise moved by them in one direction but not in the other, resetting-springs for the indicator-wheels tending to hold them in and return them to normal position, and means for temporarily holding the indicator-wheels in the positions to which they are moved by said frames.

34. In a cash register and indicator, the combination of a plurality of movable frames or members, a plurality of actuating-springs for moving them from normal position, means for holding said frames in normal position and releasing them at will, a plurality of sets of stops, one for each frame and the stops of each set being adapted to be severally moved into the path of the corresponding frame to arrest it at different points in its movement from normal position, a plurality of register-wheels coöperating with the respective frames and moved by them in one direction and not in the other, a plurality of indicator-wheels also coöperating with the respective frames and likewise moved by them in one direction but not in the other, resetting-springs for the indicator-wheels tending to hold them in and return them to normal position, and means for temporarily holding the indicator-wheels in the positions to which they are moved by said frames.

35. In a cash register and indicator, the combination of a plurality of movable frames or members, a plurality of actuating-springs for moving them from normal position, a plurality of sets of stops, one set for each frame and the stops of each set being adapted to be severally moved into the path of the corresponding frame to arrest it at different points in its movement from normal position, a plurality of latches for holding the movable frames in normal position, each of said latches being adapted to be disengaged from its frame by the act of moving one of the stops into the path of such frame, a plurality of register-wheels coöperating with the respective frames and moved by them in one direction and not in the other, a plurality of indicator-wheels also coöperating with the respective frames and likewise moved by them in one direction but not in the other, resetting-springs for the indicator-wheels tending to hold them in and return them to normal position, and means for temporarily holding the indicator-wheels in the position to which they are moved by said frames.

36. In a cash register and indicator, the combination of a plurality of movable frames or members, a plurality of actuating-springs for moving them from normal position, a plurality of sets of stops, one set for each frame and the stops of each set being adapted to be severally moved into the path of the corresponding frame to arrest it at different points in its movement from normal position, a plurality of latches for holding the movable frames in normal position, a plurality of sets or groups of key-levers, one set or group for each set of stops and coöperating therewith and with the latch of the corresponding movable frame to project the stops into the path of such frame and to disengage the latch therefrom, a plurality of register-wheels coöperating with the respective frames and moved by them in one direction and not in the other, a plurality of indicator-wheels also coöperating with the respective frames and likewise moved by them in one direction but not in the other, resetting-springs for the indicator-wheels tending to hold them in and return them to normal position, and means for temporarily holding the indicator-wheels in the position to which they are moved by said frames.

37. In a cash register and indicator, the combination of a plurality of indicator-wheels, resetting-springs therefor tending to hold the wheels in and return them to normal position, a plurality of stronger actuating-springs adapted to turn the indicator-wheels from normal position and put their resetting-springs under tension, a plurality of sets or groups of keys and connections, one for each indicator-wheel, for determining the movements of said wheels by their actuating-springs, and means controlled by said keys for temporarily holding the indicator-wheels in the positions to which they are moved by said actuating-springs, whereby upon operating a key in any set or group the corresponding indicator-wheel will be released and its resetting-spring permitted to return it to or toward normal position, and the actuating-spring thereupon turn it forward again to position to indicate the value of the operated key.

38. In a cash register and indicator, the combination of a plurality of register-wheels, a plurality of actuating-springs therefor, a plurality of indicator-wheels corresponding to the register-wheels and actuated by the same springs, resetting-springs for the indicator-wheels adapted to be overcome and put under tension by the actuating-springs when the latter turn the indicator-wheels from normal position, a plurality of sets or groups of keys and connections, one for each register and indicator wheel, for determining the movements imparted to said wheels by the actuating-springs, and means controlled by said keys for temporarily holding the indicator-wheels in the positions to which they are moved by said actuating-springs.

39. In a cash register and indicator, the combination of a plurality of register-wheels mounted upon a central shaft, a plurality of actuating-springs therefor, a plurality of indicator-wheels mounted upon a second shaft above and parallel with the register-wheel shaft, said indicator-wheels corresponding to the register-wheels and actuated by the same springs, resetting-springs for the indicator-wheels adapted to be overcome and put under tension by the actuating-springs when the latter turn the indicator-wheels from normal position, a plurality of sets or groups of keys and connections, one for each register and indicator wheel, for determining the movements imparted to said wheels by the actuating-springs, and means controlled by said keys for temporarily holding the indicator-wheels in the positions to which they are moved by said actuating-springs.

40. In a cash register and indicator, the combination of a plurality of movable frames or members, means for moving said frames from normal position, a plurality of sets or groups of keys, one for each frame, for determining the movements of said frames from normal position, a plurality of indicator-wheels moved by the respective frames in one direction but not in the other, resetting-springs for the indicator-wheels, and means for temporarily holding the indicator-wheels in indicating position against the stress of the resetting-springs.

41. In a cash register and indicator, the combination of a plurality of movable frames or members, means for moving said frames from normal position, a plurality of sets or groups of keys, one set for each frame, for determining the movements of said frames from normal position, a plurality of register-wheels moved by the respective frames in one direction and not in the other, a plurality of indicator-wheels also moved by the respective frames in one direction but not in the other, resetting-springs for the indicator-wheels, and means for temporarily holding said wheels in indicating position against the stress of their resetting-springs.

42. In a cash register and indicator, the combination of a plurality of movable frames or members, means for moving said frames from normal position, a plurality of sets or groups of keys, one set for each frame, for determining the movements of said frames from normal position, a plurality of indicator-wheels moved by the respective frames in one direction but not in the other, resetting-springs for the indicator-wheels, and means controlled by the keys for temporarily holding the indicator-wheels in indicating position against the stress of their resetting-springs.

43. In a cash register and indicator, the combination of a plurality of movable frames or members, means for moving said frames from normal position, a plurality of sets or groups of keys, one for each frame, for determining the movements of said frames from normal position, a plurality of register-wheels moved by the respective frames in one direction and not in the other, a plurality of indicator-wheels also moved by the respective frames in one direction but not in the other, resetting-springs for the indicator-wheels, and means controlled by the keys for temporarily holding the indicator-wheels in indicating position against the stress of their resetting-springs.

44. In a cash register and indicator, the combination of a plurality of movable frames or members, a plurality of actuating-springs for moving said frames from normal position, a plurality of sets or groups of keys, one set for each frame, for determining the movements of said frame by their actuating-springs, a plurality of register-wheels moved by the respective frames in one direction and not in the other, a plurality of indicator-wheels also moved by the respective frames in one direction but not in the other, resetting-springs for the indicator-wheels put under tension at the movement of said wheels from normal position by the main actuating-springs, and means controlled by the keys for temporarily holding the indicator-wheels in the positions to which they are moved by said springs.

45. In a cash register and indicator, the combination of a plurality of movable frames or members, means for moving said frames from normal position, a plurality of sets of stops, one set for each frame and the stops of each set being adapted to be severally moved into the path of the corresponding frame to arrest it at different points in its movement from normal position, a plurality of sets of keys coöperating with said stops, a plurality of register-wheels coöperating with the respective frames and moved by them in one direction and not in the other, a plurality of indicator-wheels also coöperating with the respective frames and likewise moved by them in one direction but not in the other, resetting-springs for the indicator-wheels tending to hold them in and return them to normal position, and means controlled by the keys for temporarily holding the indicator-wheels in the positions to which they are moved by said frames.

46. In a cash register and indicator, the combination of a plurality of movable frames or members, means for moving said frames from normal position, a plurality of sets of stops, one set for each frame and the stops of each set being adapted to be severally moved into the path of the corresponding frame to arrest it at different points in its movement from normal position, a plurality of sets or groups of key-levers, one set or group for each set of stops and coöperating therewith to project the stops into the paths of the movable frames, a plurality of registering-wheels coöperating with the respective frames and moved by them in one direction and not in the other, a plurality of indicator-wheels also coöperating with the respective frames and likewise moved by them in one direction but not in the other, resetting-springs for the indicator-wheels tending to hold them in and return them to normal position, and means controlled by the key-levers for temporarily holding the indicator-wheels in the positions to which they are moved by said frames.

47. In a cash register and indicator, the combination of a plurality of movable frames or members, a plurality of actuating-springs for moving them from normal position, a plurality of latches coöperating with the several frames to hold them in normal position, a plurality of sets of stops, one set for each frame and the stops of each set being adapted to be severally moved into the path of the corresponding frame to arrest it at different points in its movement from normal position, a plurality of sets or groups of keys, one set for each set of stops and coöperating therewith and with the latch of the corresponding movable frame, to project the stops into the path of said frame and to disengage the latch from said frame, a plurality of indicator-wheels coöperating with the respective frames and moved by them in one direction but not in the other, resetting-springs for the indicator-wheels, and means controlled by the keys for temporarily holding said wheels in indicating position against the stress of their resetting-springs.

48. In a cash register and indicator, the combination of a plurality of movable frames or members, a plurality of actuating-springs for moving them from normal position, a plurality of latches coöperating with the several frames to hold them in normal position, a plurality of sets of stops, one set for each frame and the stops of each set being adapted to be severally moved into the path of the corresponding frame to arrest it at different points in its movement from normal position, a plurality of sets or groups of keys, one set for each set of stops and coöperating therewith and with the latch of the corresponding movable frame, a plurality of register-wheels and a plurality of indicator-wheels coöperating with the respective frames and each moved by said frames in one direction but not in the other, resetting-springs for the indicator-wheels, and means controlled by the keys for temporarily holding the indicator-wheels in indicating position against the stress of their resetting-springs.

49. In a cash register and indicator, the combination, with a series of keys, of an indicator-wheel, a pinion connected with said wheel, a rack-bar meshing with the pinion, a lever for actuating the rack-bar, a spring for actuating the lever, catch mechanism to engage and hold the lever until released, and mechanism between the keys and catch mechanism whereby the movement of one of the former operates the catch mechanism to release the lever, substantially as described.

50. In a cash register and indicator, the combination, with a series of keys, of an indicating-wheel, a pinion connected with said wheel, a rack-bar meshing therewith and provided with a longitudinal slot, a lever having a connection engaging said slot in the rack-bar, mechanism to move the lever, and catch mechanism adapted to engage and hold the indicating-wheel while the lever returns to its normal position, substantially as described.

51. In a cash register and indicator, the combination, with an indicating-wheel, and a pinion connected therewith, of a rack-bar meshing with the pinion, spring mechanism to move the rack-bar, a pawl or latch for engaging and holding the indicator-wheel, and a lever terminating adjacent to the pawl and bearing thereon and adapted to release the pawl and allow the indicating-wheel to return to its normal position, substantially as described.

52. In a cash register and indicator, the combination, with an indicating-wheel and a pinion connected therewith, of a rack-bar meshing with the pinion, a lever having a connection engaging a slot in the rack-bar, mechanism to move the lever, and a pivoted catch on the rack-bar adapted to engage the connection from the lever while the rack-bar is moving from normal position, substantially as described.

53. In a cash register and indicator, the combination, with an indicating-wheel and a pinion connected therewith, of a rack-bar meshing with the pinion, a lever to actuate the rack-bar, a link extending from the lever to the rack-bar, a pin on the link traveling in a slot in the rack-bar, a block on the end of the pin, a latch-arm on the end of the rack-bar, and depressions in the rack-bar beneath the latch-arm, substantially as described.

54. In a cash register and indicator, the combination of a series of keys, a lever in the form of a bar adjacent thereto and adapted to be operated by the movement of the keys, an indicator-wheel, a pawl or latch for holding said wheel in indicating position, a lever for disengaging said pawl, and an arm connected with the first-named lever and adapted to operate upon the second-named lever, whereby a movement of the key disengages the indicating-wheel and allows it to return to its normal position before being moved to its second indicating position, substantially as described.

55. In a cash register and indicator, the combination, with a series of keys, of a lever $E^3$ adapted to be operated by any one of the keys, an indicator-wheel $K^5$ having a pinion K connected to it, a pawl $K^3$ for holding said wheel in indicating position, a lever $T^3$ for releasing the pawl from engagement with the pinion K, and the arm V for operating said lever $T^3$, said arm V being connected with the lever $E^2$ by the rod $f^3$, substantially as described.

56. In a cash register and indicator, the combination, with a series of keys, of a register-wheel, a spring-impelled lever connected with the keys and adapted to be released by the movement of any one of them, and connections between said lever and register-wheel for moving the latter when a key is operated, substantially as described.

57. In a cash register and indicator, the combination, with a series of keys and a register-wheel, of a spring-impelled reciprocating lever, catch mechanism for holding the lever, mechanism for releasing said catch mechanism when a key is operated, and mechanism on the lever for engaging and moving the register-wheel when the lever is released, substantially as described.

58. In a cash register and indicator, the combination, with a series of keys and a register-wheel and an indicator-wheel, of a spring-impelled reciprocating lever connected with the keys and also with the register and indicator wheels, whereby a movement of any one of the keys releases the lever and the latter actuates the register and indicator wheels, substantially as described.

59. In a cash register and indicator, the combination, with a series of keys and a register-wheel and an indicator-wheel, of a spring-impelled reciprocating lever, catch mechanism for holding said lever, and connections between the catch mechanism and the keys whereby the movement of any one of the latter releases the catch mechanism, said lever being connected to both the register-wheel and the indicator-wheel, whereby a movement of the lever operates both wheels, substantially as described.

60. In a cash register and indicator, the combination, with a series of keys, of an indicator-wheel $K^5$, a register-wheel M, a spring-impelled lever $G^2$ $G^3$ connected with both the indicator-wheel and the register-wheel and adapted to operate both wheels, means for holding the spring-impelled lever in normal position, and a lever $E^2$ operated by the keys and adapted to release said lever, substantially as described.

61. In a cash register and indicator, the combination, with an indicator-wheel and a register-wheel, of a lever $G^2$ $G^3$ connected with both of said wheels, a spring for moving said lever from normal position, and a lever $E^2$ for returning it to normal position, substantially as described.

62. In a cash register and indicator, the combination, with a register-wheel provided with a series of holes $m'$, of a spring-impelled lever $G^3$ carrying the sliding pin $L^5$ adapted to be engaged with one of the holes in the wheel as the lever moves in one direction and free thereof as the lever moves in the opposite direction, and a second sliding pin $m^3$ mounted in fixed position and coöperating with the holes $m'$ of the register-wheel to prevent the latter being turned backward, substantially as described.

63. In a cash register and indicator, the combination, with a register-wheel, of a spring-impelled lever $G^3$ carrying a pin $L^5$ adapted to coöperate with said wheel and held in its normal position by a spring, and the lever $L^2$ adapted to force said pin into engagement with the wheel when the lever is operated by the movement of a key, substantially as described.

64. In a cash register and indicator, the combination of a series of keys, a register-wheel and a spring-impelled lever for operating the same, of a catch $C^3$ for holding said lever in normal position, and a lever $E^2$ coöperating with said catch, substantially as described.

65. In a cash register and indicator, the combination of a series of keys, a register-wheel and a spring-impelled lever $G^3$ for operating the same, the spring-catch $C^3$ for engaging the lever $G^3$ to hold it in normal position, and the lever $E^2$ adapted to be tilted by the movement of the key and coöperate with a projection $c$ on the catch $C^3$ and disengage the latter from the lever $G^3$, substantially as described.

66. In a cash register and indicator, the combination, with a plurality of indicator-wheels held in indicating position by pawls or latches, of a plurality of levers corresponding to the several pawls for disengaging them from the indicator-wheels, a movable rod $S^2$ common to said levers, and the rod S connected with the rod $S^2$ and coöperating with the movable cover of the cash-receptacle, substantially as described.

67. In a cash register and indicator, the combination, with a series of keys, of a universal bar for locking said keys, a catch for holding said bar out of locking position, and a rod extending from said catch to the front of the machine whereby a movement of the rod operates to lock and unlock the keys, substantially as described.

68. In a cash register and indicator, the combination, with a series of keys, of a universal bar for locking said keys, a latch $Q^5$ for engaging and holding said bar out of its locking position, a rod $Q^9$ extending to the front of the machine, connections between the rod $Q^9$ and the rod $Q^5$ for operating the latter to release the universal bar, and a second latch $Q^7$ pivoted to the latch $Q^5$ and also coöperating with said bar, substantially as described.

69. In a cash register and indicator, the combination of a rod $Q^9$, universal bar $Q^4$, arm $Q'$, bell-crank lever $Q^2$ $Q^3$, and latch $Q^5$ operated by said bell-crank lever, substantially as described.

70. In a cash register and indicator, the combination of the rod $Q^9$, arm $Q'$, bell-crank lever $Q^2$ $Q^3$, universal bar $Q^4$, and latches $Q^5$ and $Q^7$, substantially as described.

71. In a cash register and indicator, the combination, with the series of keys, of a longitudinally-movable plate beneath the same, a series of projections on the plate normally in the path of each key, said plate being provided with sufficient space between the projections to admit the passage of a single key and the upper ends of said projections being so beveled that each key will press upon a projection and tend to shift the plate in the opposite direction from the tendency of the second key on either side, substantially as described.

72. In a cash register and indicator, the combination, with a series of keys, of a longitudinally-movable plate beneath the same, a series of projections on the plate normally in the path of each key, said plate being provided with sufficient space between the projections to permit the passage of a single key, the upper ends of said projections being so beveled that the pressure of each key upon a projection will tend to shift the plate in the opposite direction from the tendency of the second key on either side, and one or more springs to return the plate to its normal position, substantially as described.

73. In a cash register and indicator, the combination, with the wheel M provided at intervals with projections $m^4$, of the spring-impelled arm or lever $N^3$ adapted to engage the wheel O and move the same, the pin $N'$ for holding the arm $m^3$ against movement, and the lever N coöperating with the projections $m^4$ on the wheel M and with the pin $N'$ to disengage the latter from the arm $N^3$, substantially as described.

74. In a cash register and indicator, the combination of the wheel M provided with the projections $m^4$, the lever N, pin $N'$, pin $O^4$, arm $N^3$, pin $n$, and wheel O, substantially as described.

75. In a cash register and indicator, the combination of the wheel O, spring-impelled arm $N^3$, pin $n$ and rocking arm $p^2$ for returning the arm $N^3$ to its normal position, substantially as described.

In testimony whereof I sign this specification in the presence of two witnesses.

HARRY M. NEER.

Witnesses:
W. H. CHAMBERLIN,
FLORENCE KING.